United States Patent
Ruehmann et al.

(10) Patent No.: US 10,422,450 B2
(45) Date of Patent: Sep. 24, 2019

(54) AUTONOMOUS CONNECTION EVALUATION AND AUTOMATED SHOULDER DETECTION FOR TUBULAR MAKEUP

(71) Applicant: Weatherford Technology Holdings, LLC, Houston, TX (US)

(72) Inventors: Rainer Ruehmann, Hannover (DE); Benjamin Sachtleben, Hannover (DE); David Geissler, Hannover (DE)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 144 days.

(21) Appl. No.: 15/445,361

(22) Filed: Feb. 28, 2017

(65) Prior Publication Data

US 2018/0224029 A1 Aug. 9, 2018

Related U.S. Application Data

(60) Provisional application No. 62/454,513, filed on Feb. 3, 2017.

(51) Int. Cl.
*F16L 15/00* (2006.01)
*E21B 19/16* (2006.01)
(Continued)

(52) U.S. Cl.
CPC .......... *F16L 15/001* (2013.01); *E21B 19/165* (2013.01); *E21B 19/166* (2013.01);
(Continued)

(58) Field of Classification Search
CPC .......... E21B 17/02; E21B 17/042–043; E21B 19/16–161; E21B 19/165–166;
(Continued)

(56) References Cited

U.S. PATENT DOCUMENTS 3,368,396 A 2/1968 VanBurkleo et al.
3,594,587 A 7/1971 Martens et al.
(Continued)

FOREIGN PATENT DOCUMENTS

AU 2014215938 A1 9/2014
GB 2115940 A 9/1983
(Continued)

OTHER PUBLICATIONS

Australian Examination Report dated Jan. 25, 2019, for Australian Patent Application No. 2018200742.
(Continued)

*Primary Examiner* — Matthew P Travers
(74) *Attorney, Agent, or Firm* — Patterson + Sheridan, LLP

(57) ABSTRACT

A method of connecting a first threaded tubular to a second threaded tubular includes engaging the threads of the tubulars and rotating the first tubular relative to the second tubular to makeup a threaded connection. The method further includes, during makeup of the threaded connection: measuring time, measuring torque applied to the connection, and measuring turns of the first tubular. The method further includes using a programmable logic controller for: evaluating at least one of the measured turns, measured torque, and measured time for at least one of a discontinuity, a torque spike, and a torque drop and accepting or rejecting the connection based on the evaluation.

21 Claims, 17 Drawing Sheets

(51) Int. Cl.
*G01L 5/24* (2006.01)
*E21B 17/042* (2006.01)

(52) U.S. Cl.
CPC .............. *G01L 5/24* (2013.01); *E21B 17/042* (2013.01); *F16L 2201/10* (2013.01)

(58) Field of Classification Search
CPC .......... E21B 44/00; E21B 44/02–44/04; F16L 15/001; F16L 2201/10; G01L 5/24; Y10T 29/49766–49767; Y10T 29/49771; Y10T 29/49776; Y10T 29/5303; Y10T 29/53039; B23P 11/00; B23P 19/00; B23P 19/04

See application file for complete search history.

(56) References Cited

U.S. PATENT DOCUMENTS

| | | | |
|---|---|---|---|
| 3,745,820 | A | 7/1973 | Weiner |
| 3,855,857 | A | 12/1974 | Claycomb |
| 4,008,773 | A | 2/1977 | Wallace et al. |
| 4,091,451 | A | 5/1978 | Weiner et al. |
| 4,106,176 | A | 8/1978 | Rice et al. |
| 4,176,436 | A | 12/1979 | McCombs et al. |
| 4,365,402 | A | 12/1982 | McCombs et al. |
| 4,402,052 | A | 8/1983 | Stone et al. |
| 4,404,559 | A | 9/1983 | Renner |
| 4,592,125 | A | 6/1986 | Skene |
| 4,709,182 | A | 11/1987 | Wenske et al. |
| 4,715,451 | A | 12/1987 | Bseisu et al. |
| 4,867,236 | A | 9/1989 | Haney et al. |
| 4,875,530 | A | 10/1989 | Frink et al. |
| 5,130,700 | A | 7/1992 | Annis et al. |
| 5,205,163 | A | 4/1993 | Sananikone |
| 5,245,265 | A | 9/1993 | Clay |
| 5,245,877 | A | 9/1993 | Ruark |
| 5,272,925 | A | 12/1993 | Henneuse et al. |
| 5,315,501 | A | 5/1994 | Whitehouse |
| 5,402,688 | A | 4/1995 | Okada et al. |
| 5,637,968 | A | 6/1997 | Kainec et al. |
| 5,689,871 | A | 11/1997 | Carstensen |
| 6,241,032 | B1 | 6/2001 | Falgout, Sr. |
| 6,374,706 | B1 | 4/2002 | Newman |
| 6,516,896 | B1 | 2/2003 | Bookshar et al. |
| 6,536,520 | B1 | 3/2003 | Snider et al. |
| 6,662,110 | B1 | 12/2003 | Bargach et al. |
| 6,814,149 | B2 | 11/2004 | Liess et al. |
| 7,028,585 | B2 | 4/2006 | Pietras et al. |
| 7,044,238 | B2 | 5/2006 | Hutchinson |
| 7,073,598 | B2 | 7/2006 | Haugen |
| 7,100,698 | B2 | 9/2006 | Kracik et al. |
| 7,210,710 | B2 | 5/2007 | Williamson et al. |
| 7,286,623 | B2 | 10/2007 | Whetsel |
| 7,294,608 | B2 | 11/2007 | Oldiges et al. |
| 7,296,623 | B2 | 11/2007 | Koithan et al. |
| 7,306,054 | B2 | 12/2007 | Hutchinson |
| 7,318,488 | B2 | 1/2008 | Hutchinson |
| 7,435,088 | B2 | 10/2008 | Brajnovic |
| 7,568,522 | B2 | 8/2009 | Boutwell et al. |
| 7,588,099 | B2 | 9/2009 | Kracik |
| 7,594,540 | B2 | 9/2009 | Koithan et al. |
| 7,707,913 | B2 | 5/2010 | Halse |
| 7,757,759 | B2 | 7/2010 | Jahn et al. |
| 7,882,902 | B2 | 2/2011 | Boutwell, Jr. |
| 8,726,743 | B2 | 5/2014 | Ruehmann et al. |
| 2001/0000550 | A1* | 5/2001 | Newman .............. B25B 21/002 29/714 |
| 2003/0164276 | A1 | 9/2003 | Snider et al. |
| 2003/0178847 | A1 | 9/2003 | Galle et al. |
| 2006/0218768 | A1* | 10/2006 | Makimae .............. B23P 19/066 29/407.03 |
| 2007/0107912 | A1 | 5/2007 | Boutwell et al. |
| 2009/0151934 | A1 | 6/2009 | Heidecke et al. |
| 2009/0266539 | A1 | 10/2009 | Ruark et al. |
| 2009/0274545 | A1 | 11/2009 | Liess et al. |
| 2010/0132180 | A1 | 6/2010 | Conquergood et al. |
| 2012/0273230 | A1 | 11/2012 | Patterson et al. |
| 2014/0116687 | A1* | 5/2014 | Ruehmann ............ E21B 19/165 166/250.01 |
| 2015/0323110 | A1* | 11/2015 | Trivett .................... F16L 15/08 285/389 |

FOREIGN PATENT DOCUMENTS

| | | |
|---|---|---|
| GB | 2443955 A | 5/2008 |
| WO | 2013142950 A1 | 10/2013 |

OTHER PUBLICATIONS

European Examination Report in related application EP 18154549.2 dated Apr. 8, 2019.
Ruehmann, Rainer, et al.—"Shoulder Yielding Detection During Pipe Makeup;" presented at Offshore Technology Conference held in Houston, Texas, May 2-5, 2011, OTC 21874, pp. 1-11.
Tenaris Hydril—"-Make-up Acceptance Criteria," Sep. 1, 2010, retrieved from the Internet: URL:http://www.tenaris.com/.about./media/Files/ProductLiterature/Literatu- rePremiumConnections/RM6.sub.—Makeup.sub.—AcceptanceCriteria.sub.—ENGLI- SH1.ashx, retrieved on Apr. 3, 2013, 10 pages.
Xie, Jueren—"Analysis of Strain Rate Impact of Makeup of Oilfield Premium Casing Connections," May 17, 2011, 2011 SIMULIA Customer Conference, retrieved from the Internet: URL:http://www.simulia-china.com/download/global/2011/Xie.sub.—strain.pd- f, retrieved on Apr. 3, 2013, 12 pages.
EPO Extended European Search Report dated Jun. 4, 2018, for European Application No. 18154549.2.
PCT International Search Report and Written Opinion dated Apr. 12, 2013, for International Application No. PCT/US2012/036173.

* cited by examiner

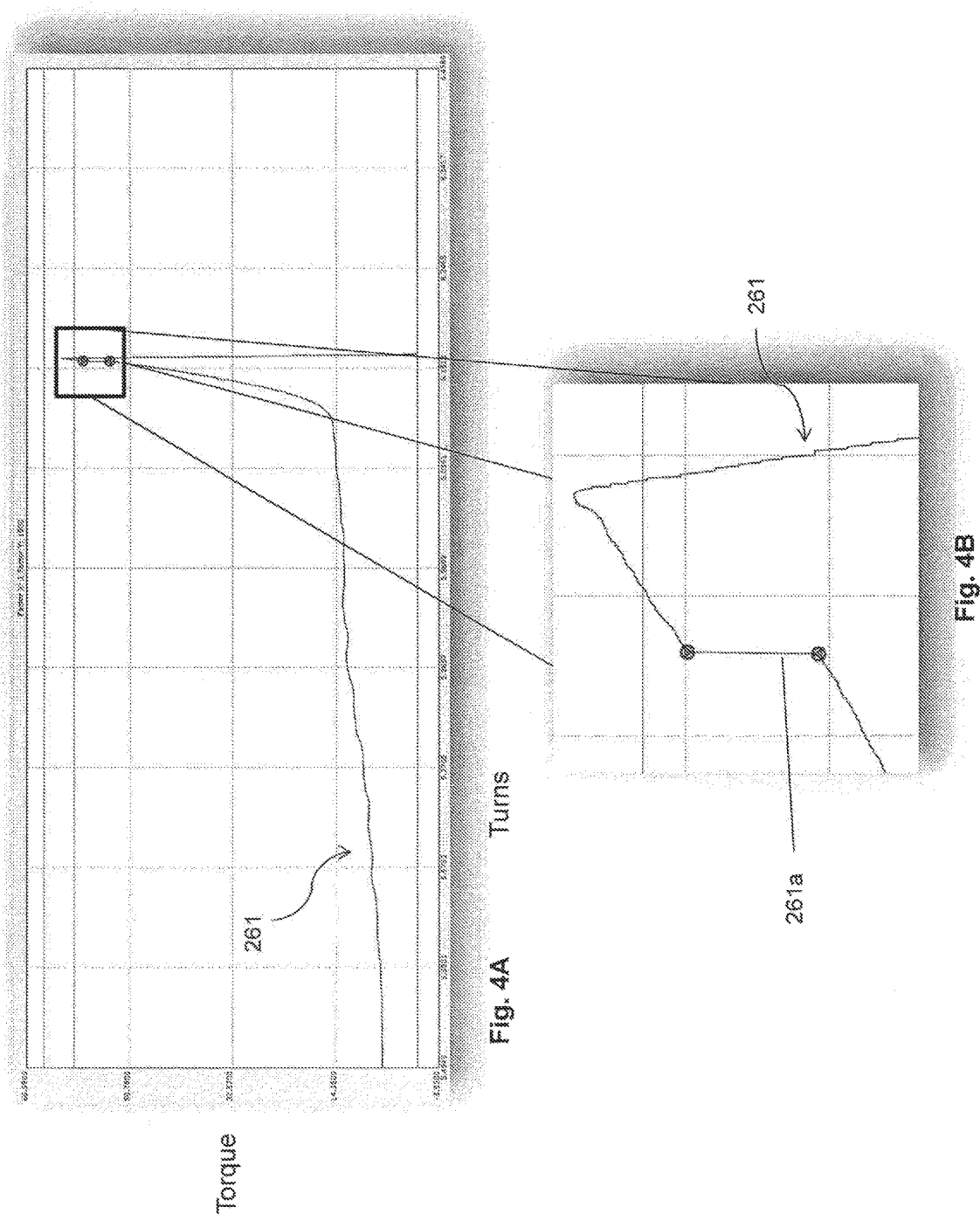

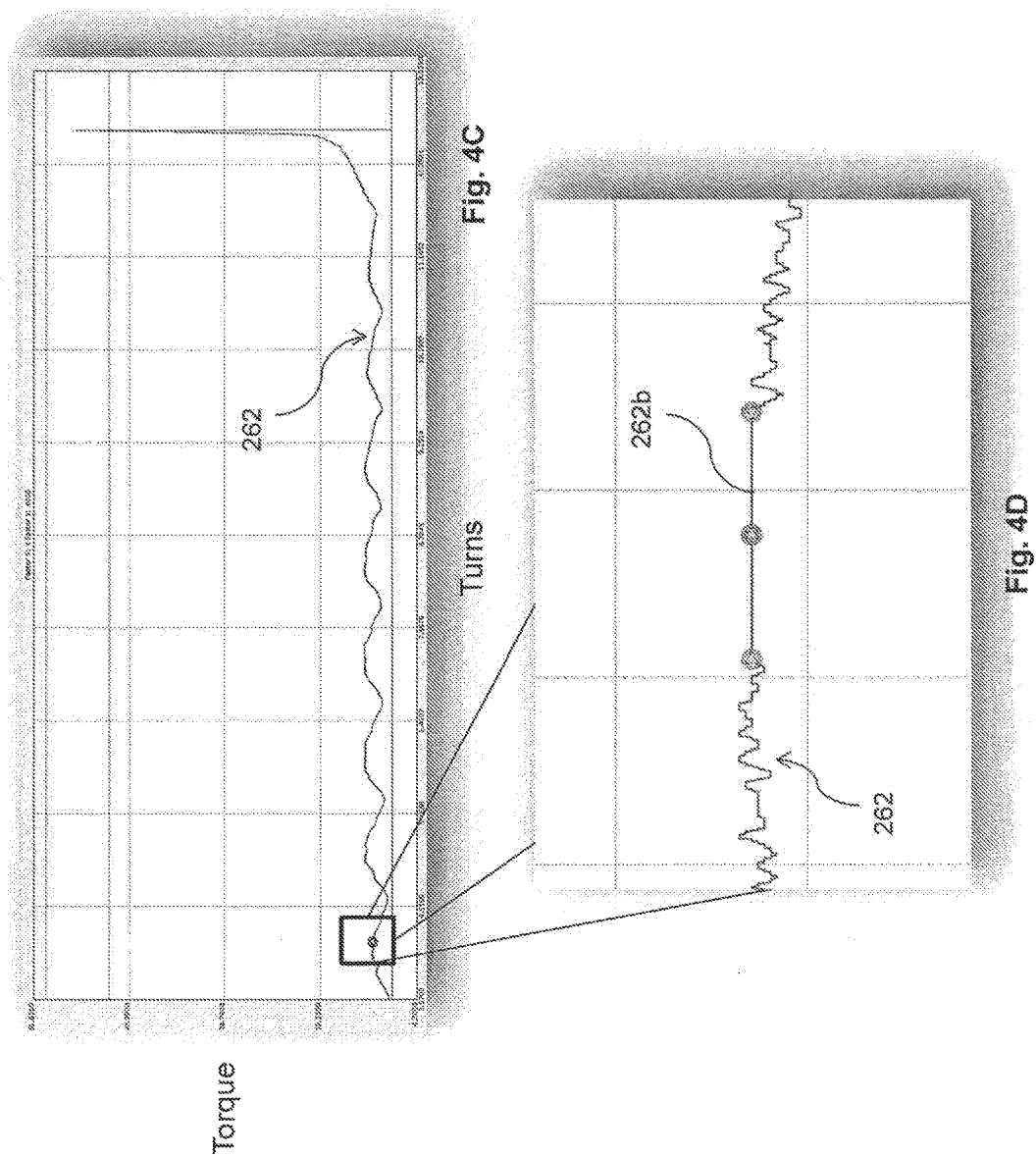

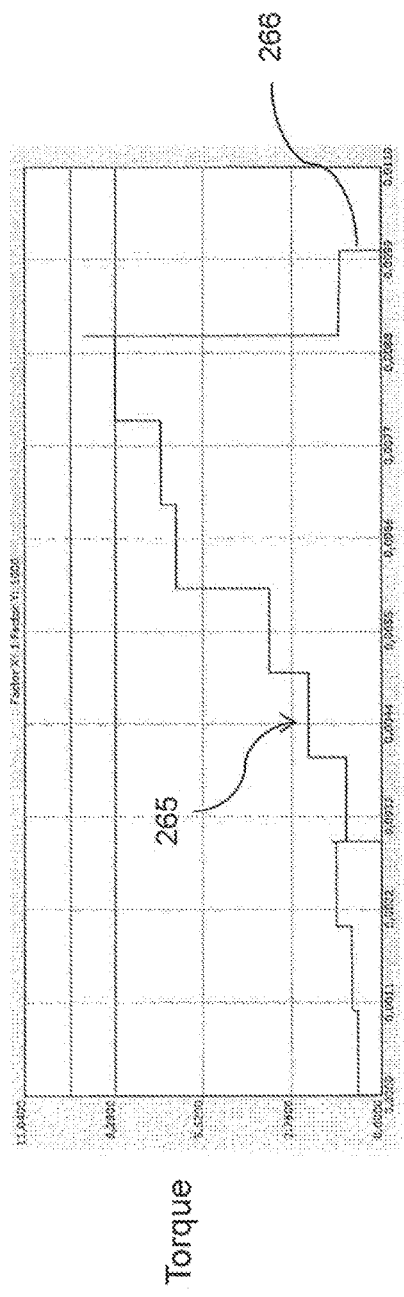
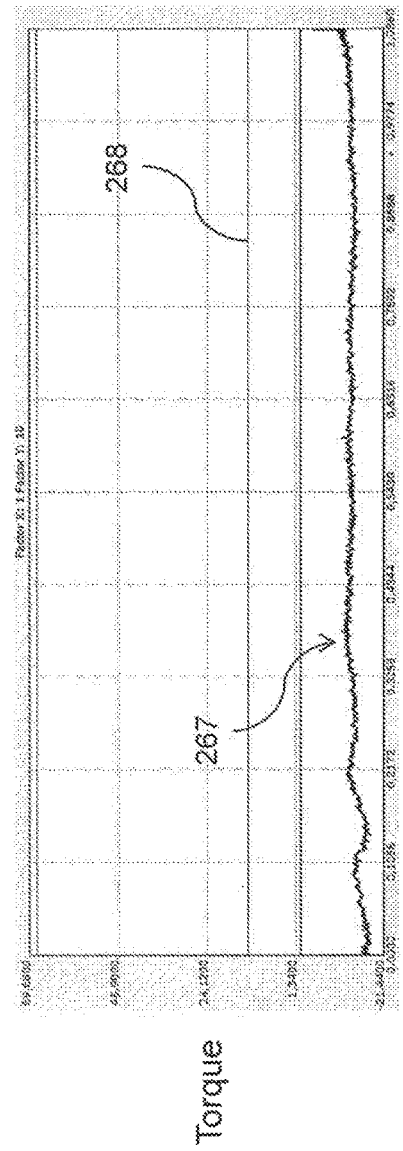
Fig. 5A
Fig. 5B

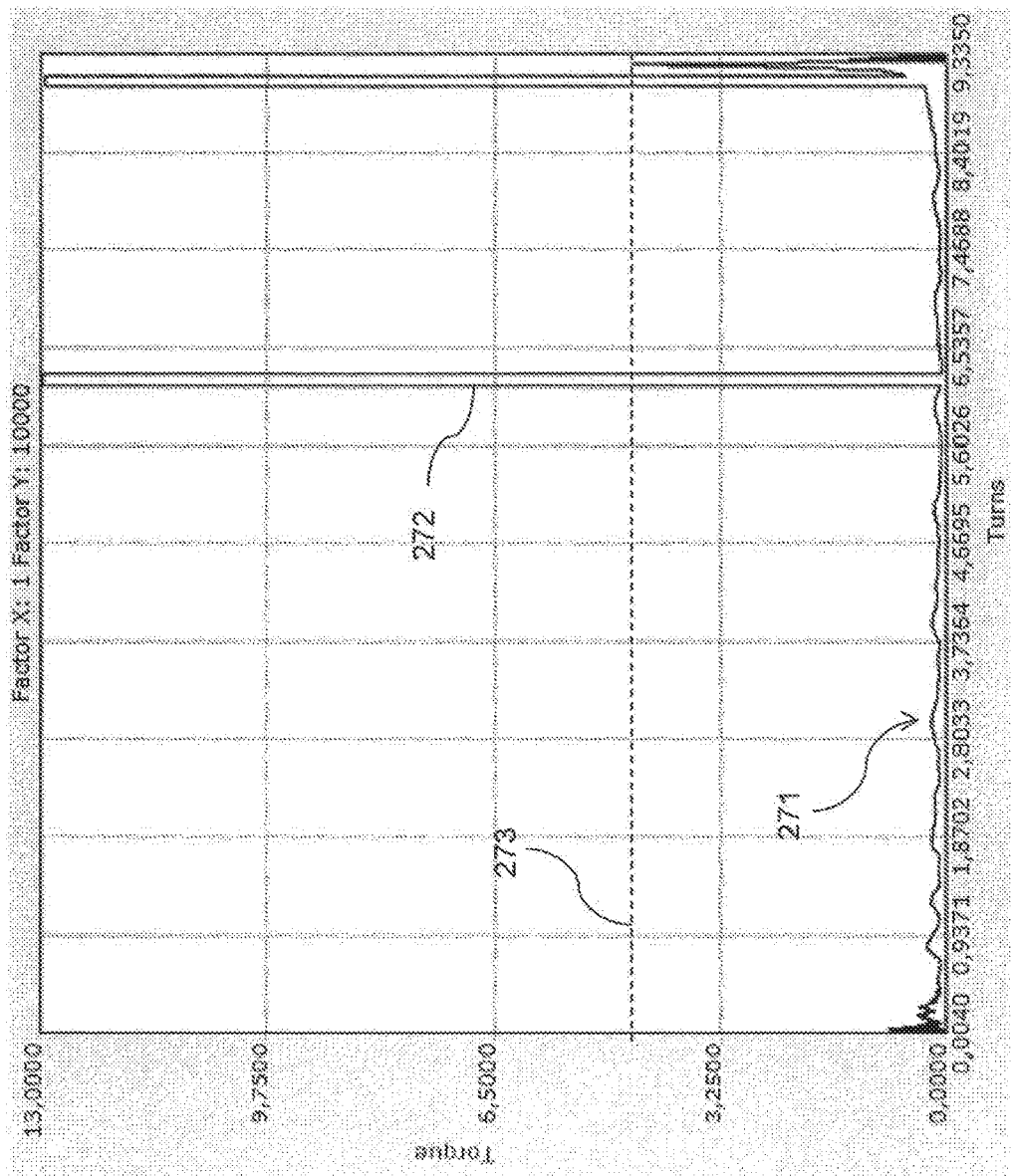

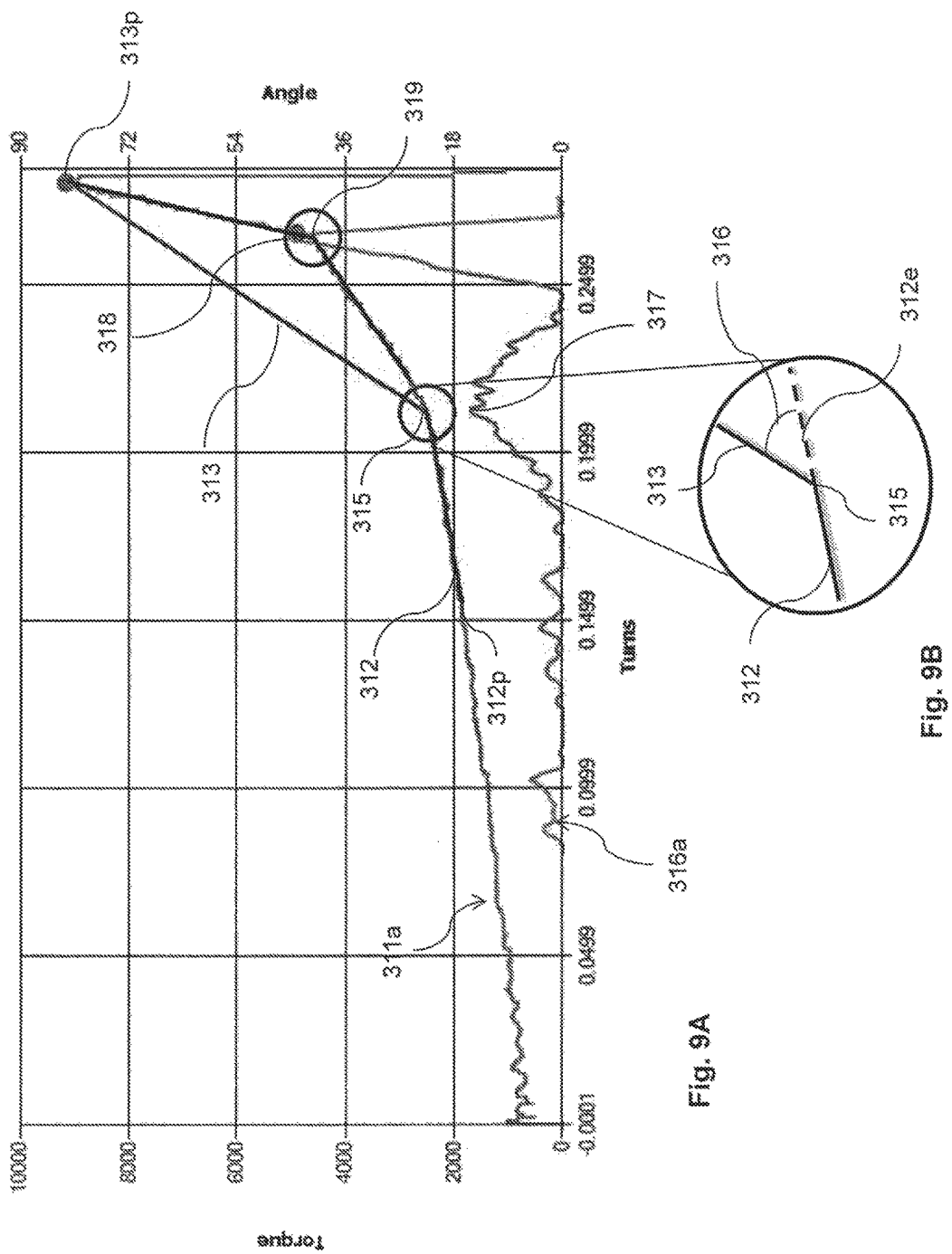

AUTONOMOUS CONNECTION EVALUATION AND AUTOMATED SHOULDER DETECTION FOR TUBULAR MAKEUP

BACKGROUND OF THE DISCLOSURE

Field of the Disclosure

The present disclosure generally relates to a method to evaluate acceptable or unacceptable connections during tubular makeup and to accept or reject the connection based on the evaluation.

Description of the Related Art

In wellbore construction and completion operations, a wellbore is formed to access hydrocarbon-bearing formations (e.g., crude oil and/or natural gas) by the use of drilling. Drilling is accomplished by utilizing a drill bit that is mounted on the end of a drill string. To drill within the wellbore to a predetermined depth, the drill string is often rotated by a top drive or rotary table on a surface platform or rig, or by a downhole motor mounted towards the lower end of the drill string. After drilling to a predetermined depth, the drill string and drill bit are removed and a string of casing is lowered into the wellbore. An annulus is thus formed between the casing string and the formation. The casing string is temporarily hung from the surface of the well. A cementing operation is then conducted in order to fill the annulus with cement. The casing string is cemented into the wellbore by circulating cement into the annulus defined between the outer wall of the casing and the borehole. The combination of cement and casing strengthens the wellbore and facilitates the isolation of certain areas of the formation behind the casing for the production of hydrocarbons.

A drilling rig is constructed on the earth's surface or floated on water to facilitate the insertion and removal of tubular strings (e.g., drill pipe, casing, sucker rod, riser, or production tubing) into a wellbore. The drilling rig includes a platform and power tools, such as an elevator and slips, to engage, assemble, and lower the tubulars into the wellbore. The elevator is suspended above the platform by a draw works that can raise or lower the elevator in relation to the floor of the rig. The slips are mounted in the platform floor. The elevator and slips are each capable of engaging and releasing a tubular and are designed to work in tandem. Generally, the slips hold a tubular or tubular string that extends into the wellbore from the platform. The elevator engages a tubular joint and aligns it over the tubular string being held by the slips. One or more power drives, e.g. a power tong and a spinner, are then used to thread the joint and the string together. Once the tubulars are joined, the slips disengage the tubular string and the elevator lowers the tubular string through the slips until the elevator and slips are at a predetermined distance from each other. The slips then reengage the tubular string and the elevator disengages the string and repeats the process. This sequence applies to assembling tubulars for the purpose of drilling, deploying casing, or deploying other components into the wellbore. The sequence is reversed to disassemble the tubular string. Conventional makeup processes evaluate the connection between the tubular joint and the tubular string and provide a recommendation to an operator. The decision to accept or reject the connection is made by the operator. Therefore, there is a need for an improved method for evaluating the connection between the tubulars and accepting or rejecting the connection autonomously.

SUMMARY OF THE DISCLOSURE

In one embodiment, a method of connecting a first threaded tubular to a second threaded tubular includes engaging the threads of the tubulars and rotating the first tubular relative to the second tubular to makeup a threaded connection. The method further includes, during makeup of the threaded connection: measuring time, measuring torque applied to the connection, and measuring turns of the first tubular. The method further includes using a programmable logic controller for: evaluating the measured turns, measured torque, and measured time for at least one of a discontinuity, a torque spike, and a torque drop and accepting or rejecting the connection based on the evaluation.

In another embodiment, a method of connecting a first threaded tubular to a second threaded tubular includes engaging the threads of the tubulars and rotating the first tubular relative to the second tubular to makeup a threaded connection. The method further includes, during makeup of the threaded connection: measuring torque applied to the connection and measuring turns of the first tubular. The method further includes using a programmable logic controller for finding at least one candidate for a shoulder position of the threaded connection from at least one of the measured torque and measured turns, analyzing the at least one candidate, and detecting the shoulder position of the threaded connection based on the analysis.

In another embodiment, a tubular makeup system includes a power drive operable to rotate a first threaded tubular relative to a second threaded tubular, a torque cell, a turns counter, and a programmable logic controller (PLC) operably connected to the power drive and in communication with the torque cell and turns counter. The PLC is configured to control an operation including engaging threads of the tubulars, rotating the first tubular relative to the second tubular to makeup a threaded connection, and, during makeup of the threaded connection, measuring time, measuring torque applied to the connection, and measuring turns of the first tubular. The operation further includes evaluating at least one of the measured turns, measured torque, and measured time for at least one of a discontinuity, a torque spike, and a torque drop, and accepting or rejecting the connection based on the evaluation.

In another embodiment, a tubular makeup system includes a power drive operable to rotate a first threaded tubular relative to a second threaded tubular, a torque cell, a turns counter, and a programmable logic controller (PLC) operably connected to the power drive and in communication with the torque cell and turns counter. The PLC is configured to control an operation including engaging threads of the tubulars, rotating the first tubular relative to the second tubular to makeup a threaded connection, and, during makeup of the threaded connection, measuring torque applied to the connection and measuring turns of the first tubular. The operation further includes finding at least one candidate for a shoulder position of the threaded connection from at least one of the measured torque and measured turns, analyzing the at least one candidate, and detecting the shoulder position of the threaded connection based on the analysis.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4D illustrate operation of a discontinuity detector for the connection evaluator.

FIGS. 5A and 5B illustrate operation of a lack of connection detector for the connection evaluator.

FIGS. 6A and 6B illustrate operation of a torque spike detector for the connection evaluator.

FIGS. 9A-F illustrate operation of a shoulder detector for the connection evaluator.

DETAILED DESCRIPTION

Figure 1A:
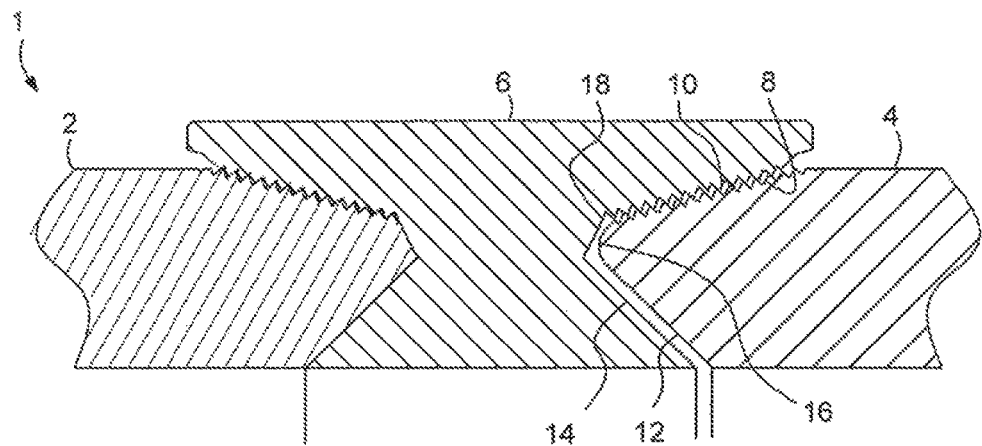
FIG. 1A is a partial cross section view of a connection between threaded premium grade tubulars.

FIG. 1A illustrates a connection 1 between premium grade tubulars 2, 4. The tubulars 2, 4 may be any oil country tubular good, such as production tubing, casing, liner, or drill pipe. The connection 1 may include a first tubular 2 joined to a second tubular 4 through a tubular coupling 6. Each of the tubulars 2, 4 and the coupling 6 may be made from a metal or alloy, such as plain carbon steel, low alloy steel, high strength low alloy steel, stainless steel, or a nickel based alloy. The end of each tubular 2, 4 may have a tapered externally-threaded surface 8 (aka a pin) which co-operates with a correspondingly tapered internally-threaded surface (aka box) 10 on the coupling 6. Each tubular 2, 4 may be provided with a torque shoulder 12 which co-operates with a corresponding torque shoulder 14 on the coupling 6. At a terminal end of each tubular 2, 4, there may be defined an annular sealing area 16 which is engageable with a co-operating annular sealing area 18 defined between the tapered portions 10, 14 of the coupling 6. Alternatively, the sealing areas 16,18 may be located at other positions in the connection 1 than adjacent the shoulders 12,14.

Figure 1B:
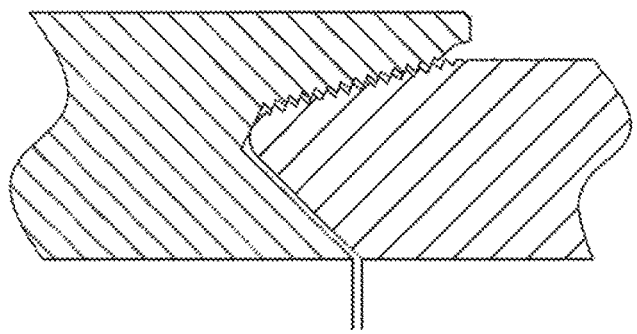
FIG. 1B is a partial cross section view of a connection between threaded premium grade tubulars in a seal position formed by engagement between sealing surfaces.
Figure 1C:
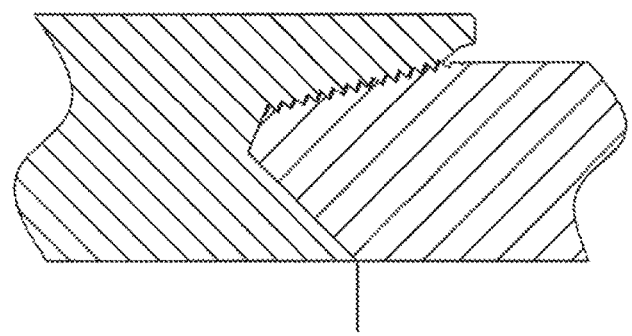
FIG. 1C is a partial cross section view of a connection between threaded premium grade tubulars in a shoulder position formed by engagement between shoulder surfaces.

During makeup, the box 10 is engaged with the pin 8 and then screwed onto the pin by relative rotation therewith. During continued rotation, the annular sealing areas 16, 18 contact one another, as shown in FIG. 1B. This initial contact is referred to as the "seal position". As the coupling 6 is further rotated, the co-operating tapered torque shoulders 12, 14 contact and bear against one another at a machine detectable stage referred to as a "shoulder position", as shown in FIG. 1C. The increasing pressure interface between the tapered torque shoulders 12, 14 cause the seals 16, 18 to be forced into a tighter metal-to-metal sealing engagement with each other causing deformation of the seals 16 and eventually forming a fluid-tight seal.

Figure 2A:
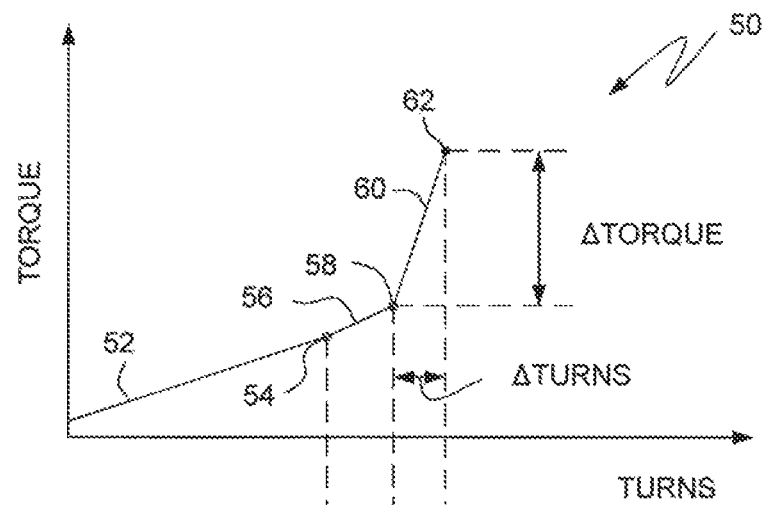
FIG. 2A illustrates an ideal torque-turns curve for the tubular connection.
Figure 2B:
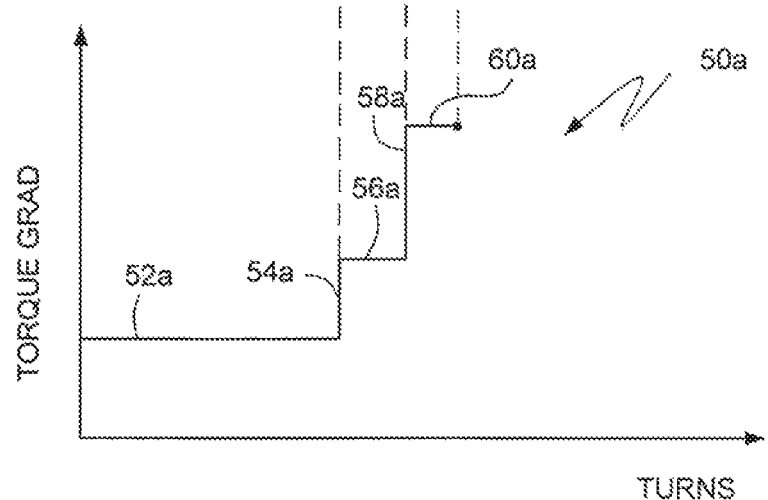
FIG. 2B illustrates an ideal torque gradient-turns curve for the tubular connection.

FIG. 2A illustrates an ideal torque-turns curve 50 for the tubular connection. FIG. 2B illustrates an ideal torque gradient-turns curve 50a for the tubular connection. During makeup of the tubulars 2, 4, torque and turns measurements may be recorded and the curves 50, 50a displayed for evaluation by a technician. Shortly after the coupling 6 engages the tubular 4 and torque is applied, the measured torque increases linearly as illustrated by curve portion 52. As a result, corresponding curve portion 52a of the differential curve 50a is flat at some positive value.

During continued rotation, the annular sealing areas 16, 18 contact one another causing a slight change (specifically, an increase) in the torque rate, as illustrated by point 54. Thus, point 54 corresponds to the seal position shown in FIG. 1B and is plotted as the first step 54a of the differential curve 50a. The torque rate then again stabilizes resulting in the linear curve portion 56 and the plateau 56a. In practice, the seal condition (point 54) may be too slight to be detectable. However, in a properly behaved makeup, a discernable/detectable change in the torque rate occurs when the shoulder position is achieved (corresponding to FIG. 1C), as represented by point 58 and step 58a. The torque rate then again increases linearly as illustrated by curve portion 60 and the plateau 60a until makeup of the connection is terminated at final torque 62.

Figure 3A:
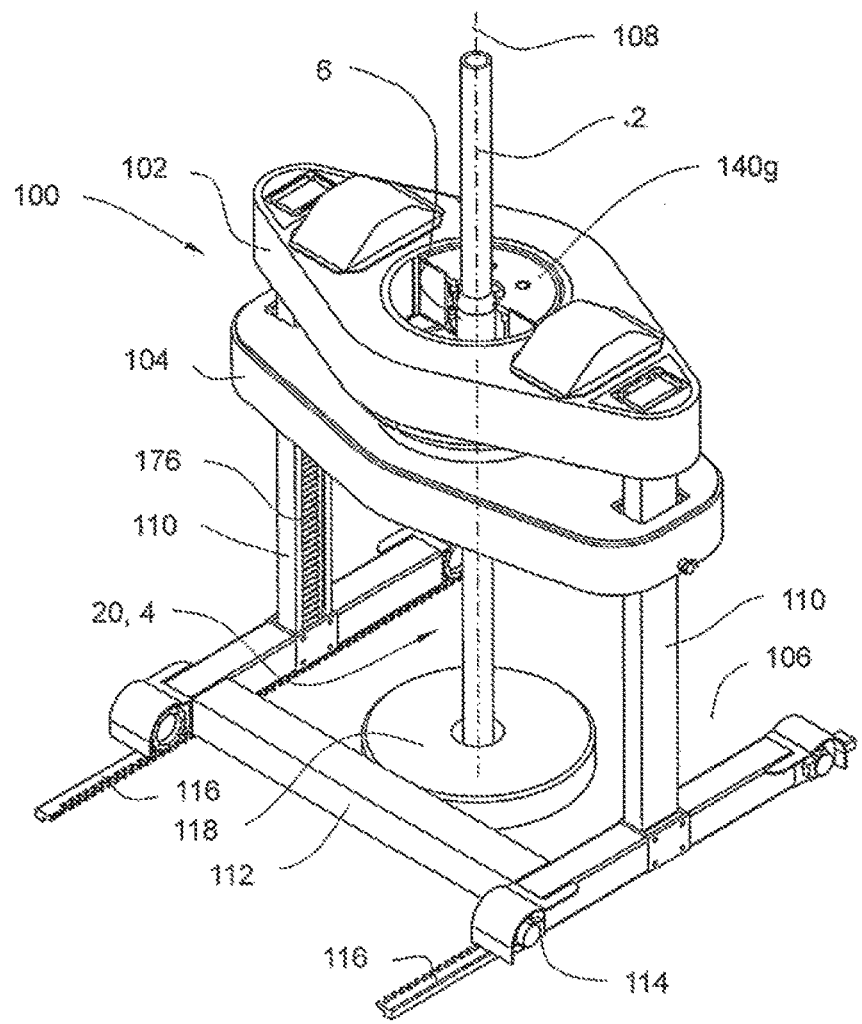
FIG. 3A is a perspective view of a tong assembly in an upper position.

FIG. 3A is a perspective view of a power drive, such as tong assembly 100, in an upper position. A group 140g of clamps has been removed for illustrative purposes. The tong assembly 100 may include a power tong 102 and a back-up tong 104 located on a drilling rig 106 coaxially with a drilling center 108 of the drilling rig 106. The assembly 100 may be coupled in a vertically displaceable manner to one or more guide columns 110 (two shown) arranged diametrically opposite each other relative to the drilling center 108. The guide columns 110 may be connected to a chassis 112 which by wheels 114 and hydraulic motors (not shown) may be displaced horizontally on rails 116 connected to the drilling rig 106. In the operative position, the assembly 100 may be located immediately above the slips 118 of the drilling rig 106.

The power tong 102 may include a power tong housing provided with a through aperture that corresponds to the guide columns 110, and an undivided drive ring connected via a bearing ring (not shown). The bearing ring may have a toothed ring (not shown) in mesh with cogwheels (not shown) on one or more hydraulic motors (not shown), such as two. One of the motors may be a spinner motor (high speed, low torque) and the other motor may be one or more torque motors (high torque, low speed). The toothed ring may be coupled to the drive ring by screw-bolt-joints (not shown). The hydraulic motors may be arranged to rotate the drive ring about the drilling center 108. The two hydraulic motors may be disposed on diametrically opposite sides of the drive ring. A cover may be provided to cover the power tong housing.

In the drive ring and co-rotating with this may be two crescent-shaped groups 140g (only one shown) of clamps. Each group 140g of clamps may be provided with one or more, such as three, clamps distributed around the drilling center 108. Each clamp may include a cylinder block provided with one or more, such as three, cylinder bores arranged in a vertical row. In each cylinder bore may be a corresponding longitudinally displaceable piston that seals against the cylinder bore by a piston gasket. A rear gasket may prevent pressurized fluid from flowing out between the piston and the cylinder bore at the rear end of the piston.

The pistons may be fastened to the housing of the group 140g of clamps by respective screw-bolt-joints. On the part of the cylinder block facing the drilling center 108 there may be provided a gripper. The gripper may be connected to the cylinder block by fastening, such as with dovetail grooves or screw-bolt-joints (not shown). Surrounding the drive ring there may be provided a swivel ring that seals by swivel gaskets, the swivel ring may be stationary relative to the power tong housing. The swivel ring may have a first passage that communicates with the plus side of the pistons via a first fluid connection, a second passage that communicates with the minus side of the pistons via a second fluid connection, and a further passage. The cylinder and the piston may thereby be double acting. The swivel ring, swivel gaskets and drive ring may together form a swivel coupling.

The backup tong 104 may also include the clamp groups. The back-up tong 104 may further include a back-up tong housing with guides 176 that correspond with the guide columns 110, and a retainer ring for two groups of clamps. At the guides 176 there may be cogwheels that mesh with respective pitch racks of the guide columns 110. Separate hydraulic motors may drive the cogwheels via gears. A pair of hydraulic cylinders may be arranged to adjust the vertical distance between the power tong 102 and the back-up tong 104.

In operation, when the tubular joint 2 is to be added to tubular string 20 (already including tubular joint 4), the assembly 100 may be displaced vertically along the guide columns 110 by the hydraulic motors, the gears, the cogwheels and the pitch racks until the back-up tong 104 corresponds with the pin 8 of the tubular string 20. The box 10 of the coupling 6 may have been madeup to the pin 8 of the joint 2 offsite (aka bucking operation) before the tubulars 2, 4 are transported to the rig. Alternatively the coupling 6 may be bucked on the joint 4 instead of the joint 2. Alternatively, the coupling 6 may be welded to one of the tubulars 2, 4 instead of being bucked on.

The vertical distance between the back-up tong 104 and the power tong 102 may be adjusted so as to make the grippers correspond with the coupling 6. The clamps may be moved up to the coupling 6 by pressurized fluid flowing to the first passage in the swivel ring and on through the first fluid connection to the plus side of the pistons. The excess fluid on the minus side of the pistons may flow via the second fluid connection and the second passage back to a hydraulic power unit (not shown).

The grippers may then grip their respective pin or box while the hydraulic motors rotate the drive ring and the groups 140g of clamps about the drilling center 108, while at the same time constant pressure may be applied through the swivel ring to the plus side of the pistons. The power tong 102 may be displaced down towards the back-up tong 104 while the screwing takes place. After the desired torque has been achieved, the rotation of the drive ring may be stopped. The clamps may be retracted from the tubular string 20 by pressurized fluid being delivered to the minus side of the pistons via the swivel ring. The assembly 100 may be released from the tubular string 20 and moved to its lower position.

When a joint 2 is to be removed from the tubular string 20, the operation is performed in a similar manner to that described above. When tools or other objects of a larger outer diameter than the tubular string 20 are to be displaced through the assembly 100, the grippers may easily be removed from their respective clamps, or alternatively the groups 140g of clamps can be lifted out of the drive ring.

Alternatively, other types of tong assemblies may be used instead of the tong assembly 100.

Figure 3B:
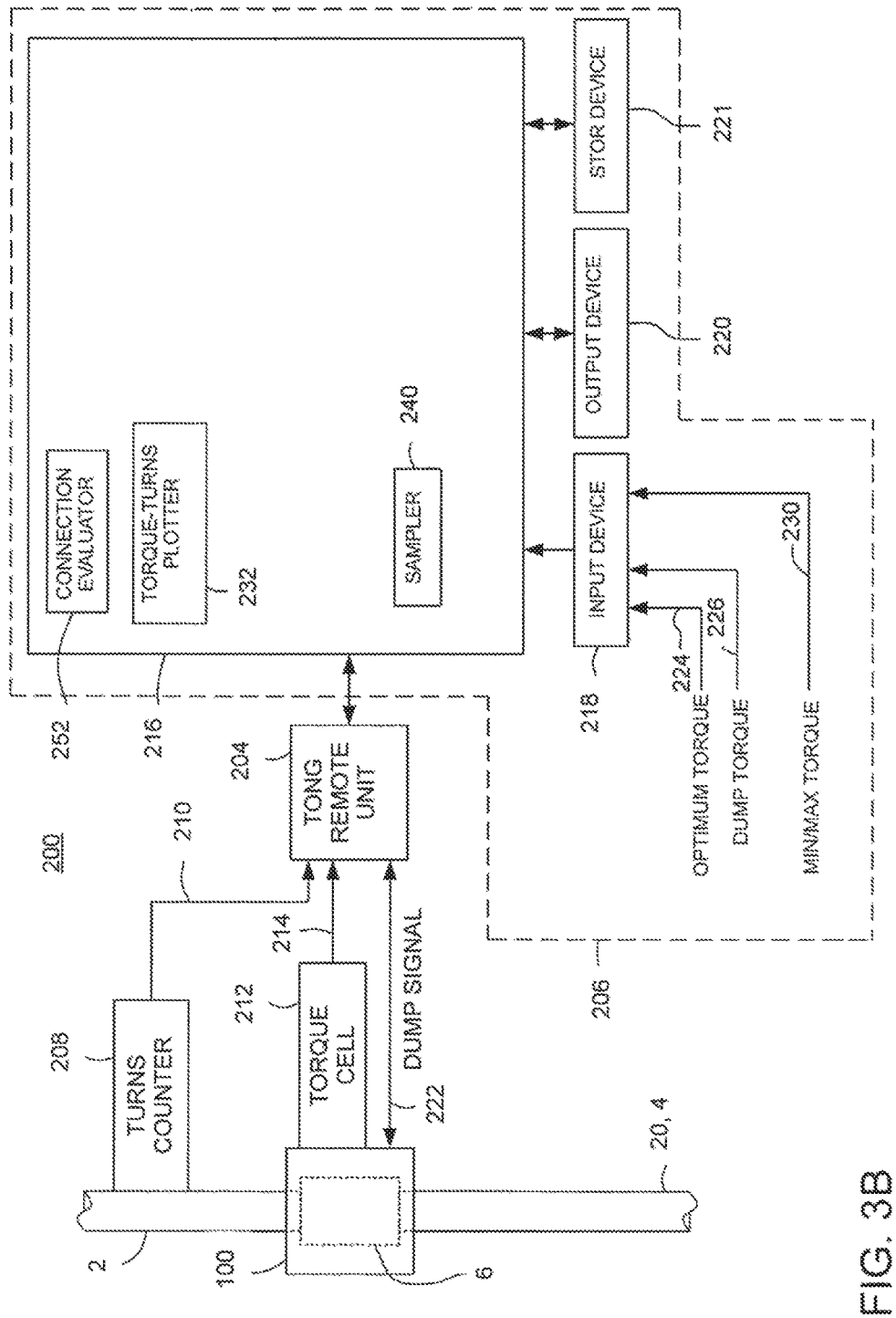
FIG. 3B is a block diagram illustrating a tubular makeup system, according to one embodiment of the present disclosure.

FIG. 3B is a block diagram illustrating a tubular makeup system 200, according to one embodiment of the present disclosure. The tubular makeup system 200 may include the tong assembly 100, a tong remote unit (TRU) 204, a turns counter 208, a torque cell 212, and a control system 206. The control system 206 may communicate with the TRU 204 via an interface. Depending on sophistication of the TRU 204, the interface may be analog or digital. Alternatively, the control system 206 may also serve as the TRU.

A programmable logic controller (PLC) 216 of the control system 206 may monitor the turns count signals 210 and torque signals 214 from the respective sensors 208, 212. Predetermined values 224, 226, 230 may be input by a technician for a particular connection. The predetermined values 224, 226, 230 may be input to the PLC 216 via an input device 218, such as a keypad. The PLC 216 may also measure time during operation of the tong assembly 100 and rotation of the tubulars.

Illustrative predetermined values 224, 226, 230 which may be input, by a technician or otherwise, include an optimum torque value 224, a dump torque value 226, and a minimum and maximum torque value 230. The minimum and maximum torque values 230 may include a set for the final position. The torque values 224, 226, 230 may be derived theoretically, such as by finite element analysis, or empirically, such as by laboratory testing and/or analysis of historical data for a particular connection. Alternatively, the dump torque value 226 may simply be an average of the final minimum and maximum torque values 230. During makeup of the connection 1, various output may be observed by a technician on an output device, such as a video monitor, which may be one of a plurality of output devices 220. A technician may observe the various predefined values which have been input for a particular connection. Further, the technician may observe graphical information such as the torque rate curve 50 and the torque rate differential curve 50a. The plurality of output devices 220 may also include a printer such as a strip chart recorder or a digital printer, or a plotter, such as an x-y plotter, to provide a hard copy output.

The comparison of measured turn count values and torque values with respect to predetermined values is performed by one or more functional units of the PLC 216. The functional units may generally be implemented as hardware, software or a combination thereof. The functional units may include a torque-turns plotter algorithm 232, a sampler 240, and a connection evaluator 252. Alternatively, the functional units may be performed by a single unit. As such, the functional units may be considered logical representations, rather than well-defined and individually distinguishable components of software or hardware. The PLC 216 may evaluate the connection after makeup for significant events, such as the shoulder position, termination, and/or a violation of a connection criterion.

Upon the occurrence of a predefined event(s), the PLC 216 may output a signal to the TRU 204 to automatically shut down or reduce the torque exerted by the tong assembly 100. For example, the signal may be issued in response to the measured torque value reaching the dump torque value 226 and/or a bad connection.

Additionally, the control system 206 may include a storage device 221, such as a hard drive or solid state drive, for recording the makeup data. The stored data may then be used to generate a post makeup report. Alternatively, the tubular makeup system power drive may be a top drive instead of the tong assembly.

In operation, one of the threaded members (e.g., tubular 2 and coupling 6) is rotated by the power tong 102 while the other tubular 4 is held by the backup tong 104. The applied torque and rotation are measured at regular intervals throughout the makeup. The frequency with which torque and rotation are measured may be specified by the sampler 240. The sampler 240 may be configurable, so that a technician may input a desired sampling frequency. The torque and rotation values may be stored as a paired set in a buffer area of memory. These values (torque, and rotation) may then be plotted by the plotter 232 for display on the output device 220.

Figure 3C:
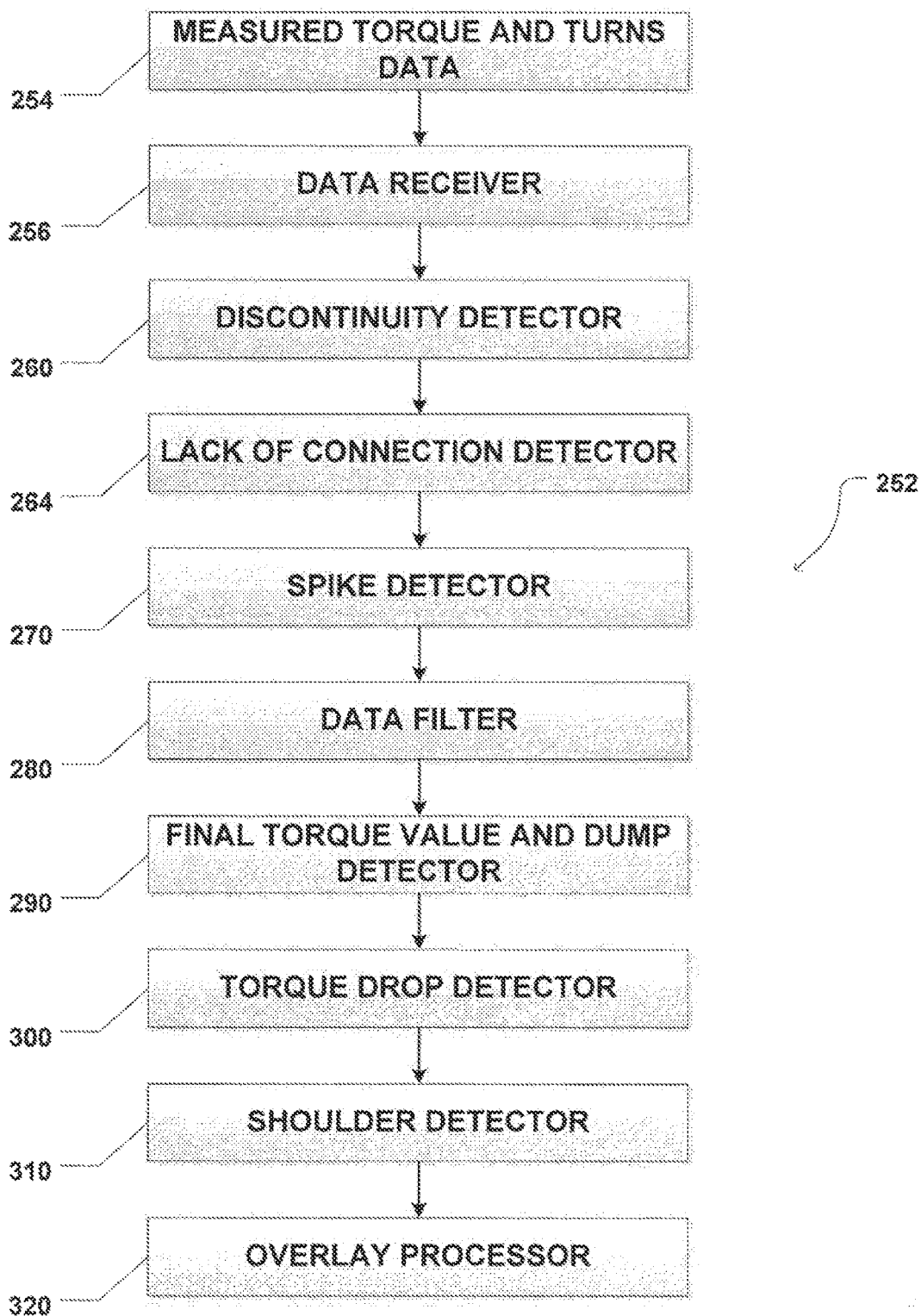
FIG. 3C is a process chain for a tubular connection evaluator.

FIG. 3C illustrates a process chain of the connection evaluator 252. The connection evaluator 252 may include a data receiver 256, a discontinuity detector algorithm 260, a lack of connection detector algorithm 264, a spike detector algorithm 270, a data filter 280, a final torque value algorithm and dump detector algorithm 290, a torque drop detector algorithm 300, a shoulder detector algorithm 310, and an overlay processor 320.

After makeup of the connection, the steps of the connection evaluator 252 may evaluate the connection between the tubulars. The data receiver 256 may receive the measured torque and turns values 254 from the sensors 208, 212. The discontinuity detector algorithm 260 receives the measured torque and turns values 254 from the data receiver 256 and begins evaluating the measured values for discontinuities. Discontinuities may be the result of equipment malfunctions. Examples of discontinuities for a makeup connection include repeating time values, time or turns counting backwards, incorrect sampling frequency, and a significant leap in measured turns or torque. FIG. 4A illustrates a torque-turns curve 261 graphically produced from the measured torque and measured turns 254. The torque-turns curve 261 may be produced by the torque-turns plotter 232. FIG. 4B illustrates a section of the torque-turns curve 261 with a torque leap 261*a*. The torque leap 261*a* corresponds to a significant increase in measured torque at constant measured turns. The torque leap 261*a* may be the result of a defective torque cell 212. FIG. 4C illustrates a torque-turns curve 262. The torque-turns curve 262 may be produced by the torque-turns plotter 232. FIG. 4D illustrates a section of the torque-turns curve 262 with a turns leap 262*b*. The turns leap 262*b* corresponds to a significant increase in measured turns at constant measured torque. The turns leap may be the result of a defective turns counter 208. The discontinuity detector algorithm 260 evaluates the measured values 254 for any discontinuities. The discontinuity detector algorithm 260 may correct the measured values 254 to eliminate the discontinuities and smooth the torque-turns curve. After evaluating the measured values 254 for any discontinuities, the discontinuity detector algorithm 260 may accept or reject the makeup based on the evaluation. For example, the discontinuity detector algorithm 260 may reject the makeup if a detected discontinuity causes the measured turns and/or torque values to be unreliable. In this embodiment, the discontinuity detector algorithm 260 may instruct the control system 206 to send a signal to the TRU 204 in response to a detected discontinuity. The TRU 204 may operate the tong assembly 100 to breakout the connection based on the signal.

Next, the lack of connection algorithm 264 may evaluate the measured torque and/or turns values. The lack of connection algorithm 264 evaluates the measured values for a failed connection between the threaded tubulars. The lack of connection algorithm 264 may evaluate the measured turns values to determine whether the measured turns exceeds a minimum turns threshold, such as 0.05 turns. The lack of connection algorithm 264 may evaluate the measured torque to determine whether the measured torque exceeds a minimum torque threshold, such as twenty percent of the minimum final torque value for an acceptable connection. FIG. 5A illustrates a torque-turns curve 265 with a final measured turns value 266. The final measured turns value 266 is less than 0.05 turns, indicating a lack of connection between the tubulars. FIG. 5B illustrates a torque-turns curve 267 and a line 268 representing twenty percent of the minimum final torque value for an acceptable connection. As seen in FIG. 5B, the torque-turns curve 267 never passes above line 268. The measured torque never reached twenty percent of the minimum final torque value, indicating a lack of connection between the tubulars. After evaluating the measured values for a lack of connection, the lack of connection algorithm 264 may accept or reject the makeup based on the evaluation. For example, the lack of connection algorithm 264 may reject the makeup if the measured turn values fail to reach 0.05 measured turns and/or if the measured torque values fail to reach twenty percent of the minimum final torque value. In this embodiment, the control system 206 may send a signal to the TRU 204 in response to a detected lack of connection. The TRU 204 may operate the tong assembly 100 to breakout the connection based on the signal.

Figure 6B:
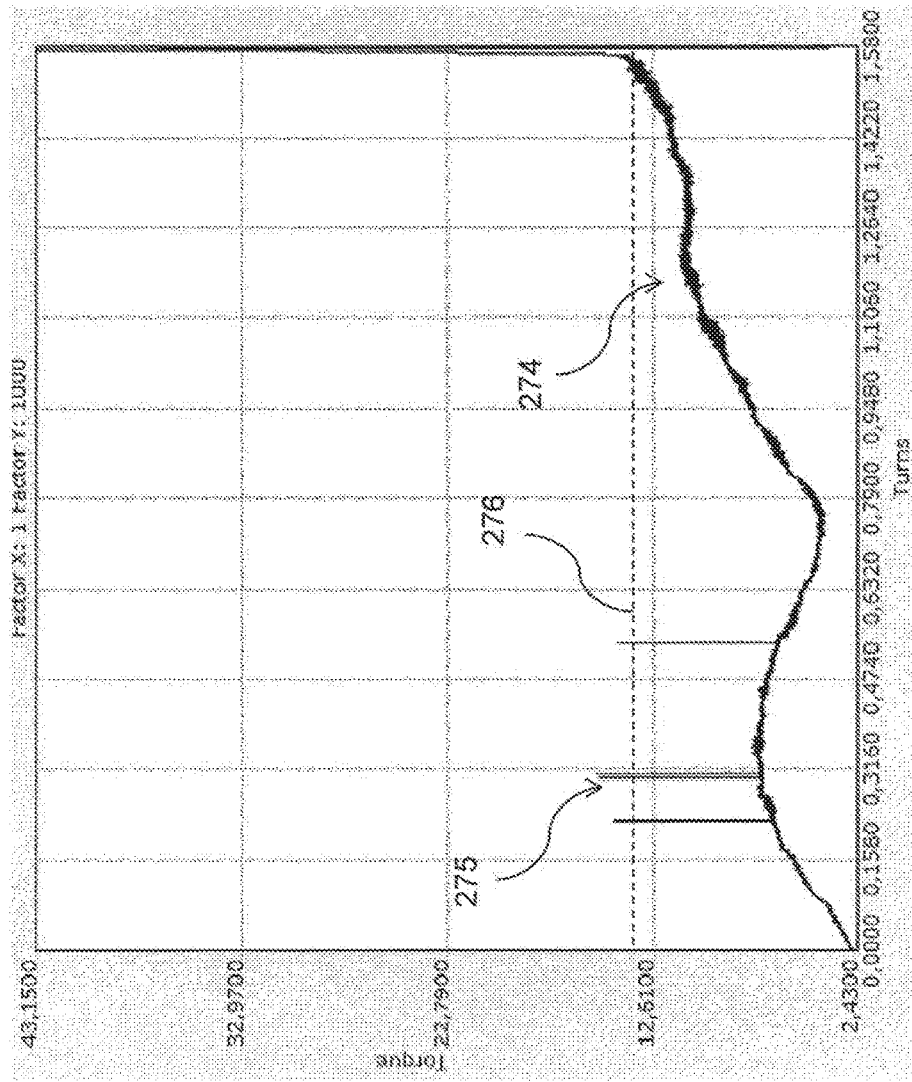

The torque spike detector algorithm 270 may evaluate the measured torque values for significant increases in the measured torque values between nearby measurements. Significant increases in the measured torque values are referred to as torque spikes. FIG. 6A illustrates a torque-turns curve 271 including a torque spike 272. Line 273 represents a first torque threshold, such as 200% of the optimum torque value 224. As seen in FIG. 6A, the torque spike 272 exceeds the line 273, indicating an unacceptable connection between the tubulars. FIG. 6B illustrates a torque-time curve 274 including a series of torque spikes 275. The torque spike detector algorithm uses a virtual window (not shown) starting on the curve 274 and moving with fixed with in time along the graph. Line 276 represents twenty percent of the optimum torque value 224. The torque spike detector algorithm 270 evaluates the series of torque spikes 275 for a second torque threshold. After finding a torque spike, the start and the end of each found spike is processed. Next, the torque spike detector algorithm 270 then determines whether a time threshold is satisfied for any torque spike satisfying the second torque threshold. The time condition is satisfied when the torque spike occurs within the time threshold, such as within twenty milliseconds of measured time from the PLC. Satisfying both the second torque threshold and time threshold for a single torque spike indicates an unacceptable connection between the tubulars. After detecting and evaluating any detected torque spikes, the torque spike detector algorithm 270 may accept or reject the makeup based on the evaluation. For example, the torque spike detector algorithm 270 may reject the makeup if a torque spike is detected with a measured torque value greater than 200% of the optimum torque value and/or a torque spike with a measured torque value greater than or equal to the given threshold of the optimum torque value within the defined threshold of measured time. In this embodiment, the control system 206 may send a signal to the TRU 204 in response to a detected torque spike. The TRU 204 may operate the tong assembly 100 to breakout the connection based on the signal.

Figure 7:
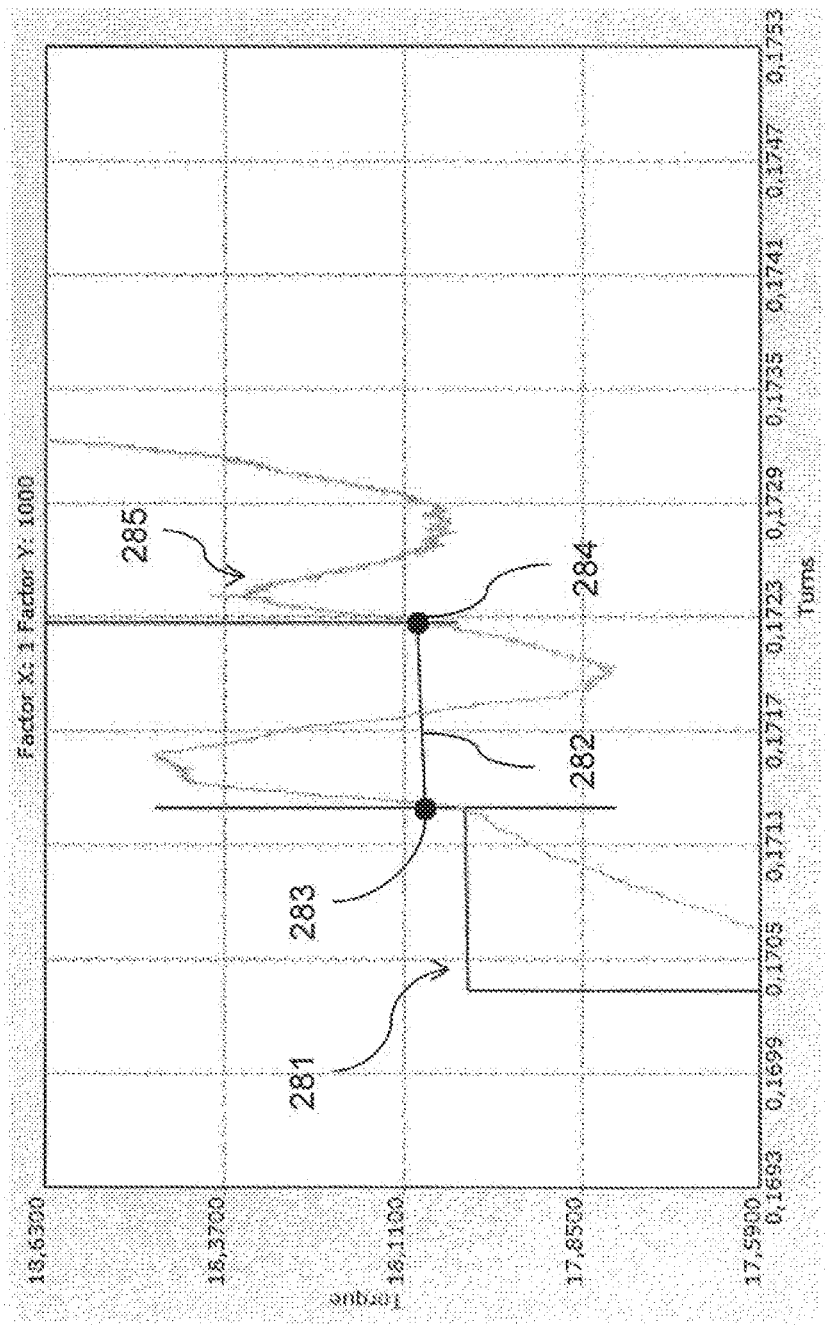
FIG. 7 illustrates operation of a data filter for the connection evaluator.

The precision of the turns counter 208 is generally lower than the precision of the torque cell 212. As a result, many torque measurements correspond to a single turns step. Previous programs average the measured torque values corresponding to a single turns step, reducing the precision of the measured torque values. The data filter 280 may enhance the resolution of the measured turns values. The data filter 280 may accomplish this by spreading the measured torque values within a single turns step. FIG. 7 illustrates a torque-turns curve 281 including a turns step 282. Point 283 corresponds to an initial measured torque and measured turns value for turn step 282. Point 284 may correspond to a final measured torque and turns value for turn step 282. The number of measured torque values between points 283, 284 may be determined by the data filter 280. An equivalent number of turns values may be calculated between the initial and final measured turns values. The calculated turns values may be uniformly spread over the turns step 282. Each calculated turns value corresponds to a measured torque value over the turns step 282. The data filter 280 spreads the measured torque values uniformly over the corresponding turns step 282, resulting in the torque-turns curve 285.

In some embodiments, the connection evaluator 252 may include the final torque value and dump detector algorithm 290. The final torque value and dump detector algorithm 290 may detect a measured final torque value of the threaded connection. The measured final torque value may correspond to the measured torque value after makeup of the connection is terminated. The measured final torque value may be greater than the dump torque value 226. In certain tubular connections, more than one final torque value may be required. For instance, a first measured final torque value may be greater than the dump torque value 226. The PLC 216 may output a signal to the TRU 204 to automatically shut down or reduce the torque exerted by the tong assembly 100 in response to the measured torque value reaching the dump torque value 226. The measured torque values may then decrease below the dump torque value 226. The PLC 216 may output a second signal to the TRU 204 to automatically reactivate or increase the torque exerted by the tong assembly 100 in response to the measured torque value dropping below the dump torque value 226. The measured torque values may then increase above the dump torque value 226. A peak of the measured torque values after increasing above the dump torque value 226 a second time may correspond to a second measured final torque value. The final torque value and dump detector algorithm 290 may evaluate the quantity of measured final torque values. The operator may input a desired quantity of final torque values according to the particular makeup connection. The final torque value and dump detector algorithm 290 may compare the input quantity with the measured quantity of final torque values. The final torque value and dump detector algorithm 290 may reject the threaded connection if the input quantity does not match the measured quantity of final torque values. In this embodiment, the control system 206 may send a signal to the TRU 204 in response to evaluation by the final torque value and dump detector algorithm 290. The TRU 204 may operate the tong assembly 100 to breakout the connection based on the signal.

Figure 8:
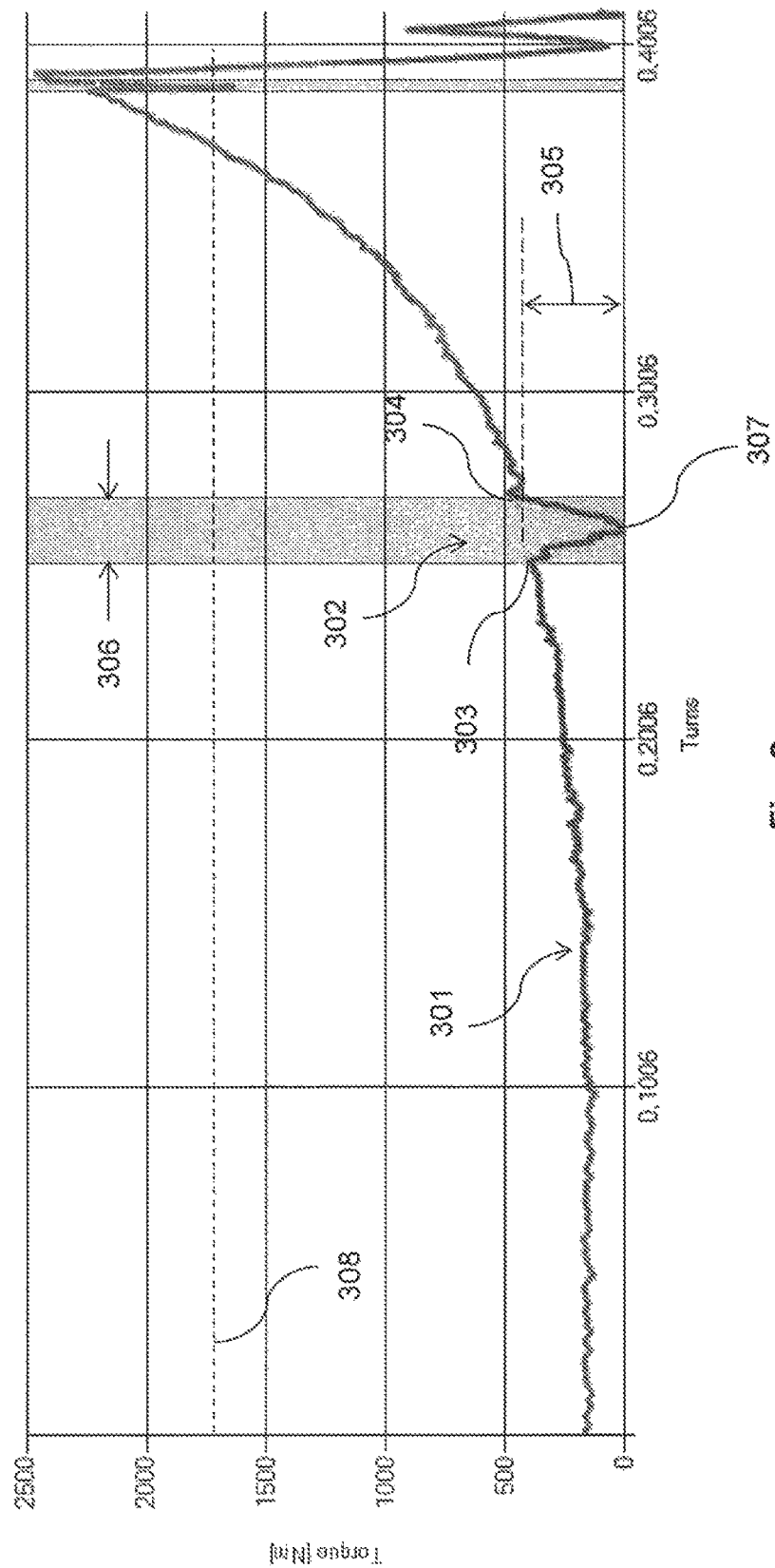
FIG. 8 illustrates operation of a torque drop detector for the connection evaluator.

The torque drop detector algorithm 300 evaluates the measured torque values for significant decreases. FIG. 8 illustrates a torque-turns curve 301 with a torque drop 302. The torque drop detector algorithm 300 measures the torque drop 302 for width in time and/or turns 306, measured torque and turn values before 303 and after 304 the torque drop 302, minimum torque value 307 at the torque drop 302, the turn gradient or change in turns with respect to time, and second derivative of turns with respect to time. An average of the measured torque values before 303 and after 304 torque drop may be calculated to determine a torque height 305. The measured values for the torque drop 302 may be evaluated by the torque drop detector algorithm 300 to determine a severity of the torque drop 302. The torque drop detector algorithm 300 may compare the torque drop height to a torque drop threshold, such as the optimum torque. For example, a ratio of the torque height 305 to the optimum torque 308 and/or a ratio of width in turns 306 to torque height 305 may be taken by the torque drop detector algorithm 300. Torque drops with a ratio of torque height 305 to optimum torque 308 of 1:10 may be considered heavy torque drops. The torque drop detector algorithm 300 may evaluate detected torque drops after detection of the shoulder point, discussed below. The torque drop detector algorithm may reject the threaded connection if a heavy torque drop is detected after the shoulder point. In this embodiment, the control system 206 may send a signal to the TRU 204 in response to the evaluation by the torque drop detector algorithm. The TRU 204 may operate the tong assembly 100 to breakout the connection based on the signal.

The shoulder detector algorithm 310 evaluates the measured torque and turns values 254 to determine the location of the shoulder 58 of the makeup connection. FIG. 9A illustrates the measured torque and turn values graphed as a torque-turns curve 311a. The shoulder detector algorithm 310 overlays lines 312, 313 on the graph. Line 312 is overlaid from a starting measured torque value 312p to a point 315 along the torque-turns curve 311a. Line 313 is overlaid from the final measured torque value 313p to the point 315. As shown in FIG. 9B, an extension 312e of line 312 is overlaid by the shoulder detector algorithm 310. An angle 316 between lines 312e, 313 is calculated by the shoulder detector algorithm 310. The lines 312, 313 move along the points of the torque-turns curve 311a, calculating the corresponding angle 316 at each point.

Alternatively, the shoulder detector algorithm 310 may determine the location of the shoulder using another method. The shoulder detection algorithm 310 may receive the measured torque and turns data from the data receiver 256. The shoulder detection algorithm 310 may define a scan range of the torque-turns curve. The scan range may be defined based on a manufacturer specification for the tubular, such as 0.2 turns before the measured final point. As shown in FIG. 9D, the shoulder detector algorithm 310 may overlay a circle centered on a beginning point of the defined scan range of the torque-turns curve. The intersection of the torque-turns curve and the circle may define a first point and a second point. The shoulder detector algorithm 310 may overlay a first line from the beginning point to the first point and a second line from the beginning point to the second point. The radius of the circle may be input into the PLC, such as 0.02 turns. The shoulder detector algorithm 310 may calculate an angle between an extension of the first line and the second line. The circle may continue moving through the scan range along the torque-turns curve, calculating a corresponding angle at each measured data point.

An angle-turns curve 316a may be graphed from the measured angle values and the corresponding measured turns values, according to any of the methods of the shoulder detection algorithm 310 described above. The shoulder detector algorithm 310 may determine at least one candidate for the location of the shoulder from the measured angle 316 and angle-turns curve 316a. The shoulder detector algorithm 310 searches the measured angle 316 values and angle-turns curve 316a for local maxima. Peaks 317, 318 are local maxima of the angle-turns curve 316a having measured angles 316 greater than a given angle threshold, such as fifteen degrees. Due to disturbances during measurement of the torque and turns of the tubulars, narrow or small peaks may result. Peaks having a measured width below a width threshold, such as 0.005 turns, may be rejected as the location of the shoulder. Peaks having a measured height below a height threshold, such as fifteen degrees, may be rejected as the location of the shoulder.

Peak 317 corresponds to point 315 on the torque-turns curve 311a. Peak 318 corresponds to point 319 on the torque-turns curve 311a. Points 315, 319 may be selected by the shoulder detector algorithm 310 as candidates for the location of the shoulder. The candidates for the location of the shoulder may be compared against each other and assigned a scoring value by the shoulder detector algorithm 310. As shown in FIG. 9E, the measured angle value, width in turns, and area under the angle-turns curve may be measured and compared between the candidates. The shoulder detector algorithm 310 may assign points to the candidates based on a scoring system for the measurements and comparison. The candidates may receive points for a measured width greater than a defined width level, such as between 0.01 and 0.015 turns. The candidates may receive points for a measured angle greater than a defined angle level, such as between twenty and twenty five degrees. The candidate with the greatest measured angle may receive points. The candidates may also be evaluated by performing a best-fit line analysis. Line 313 is overlaid from the final measured torque value 313p to each of the candidates 315, 319 for the location of the shoulder. As shown in FIGS. 2A and 2B and discussed above, the slope of the torque-turns curve remains constant after the shoulder point 58. Therefore, the line 313 from the final measured torque value 313p should follow along the torque-turns curve 311a for the candidate corresponding to the location of the shoulder. The line 313 may be evaluated and compared to the torque-turns curve 311a to determine which candidate corresponds to the location of the shoulder. For example, a best-fit analysis may be performed on the line 313 and the torque-turns curve 311a. The candidate with the least differentiation from the best-fit line may receive points. In the instance where two candidates score equally, the shoulder detector algorithm 310 may select the candidate with the least differentiation from the best-fit line as the location of the shoulder.

The shoulder detection algorithm 310 may determine a total trust level for the candidate selected as the location of the shoulder. The shoulder detection algorithm 310 may determine the total trust level for the candidate based on the angle-turns curve. The total trust level may be calculated from a height trust level and an area trust level. The height trust level and the area trust level may each contribute half of the total trust level. The total trust level may be expressed as a percentage. If the calculated trust level for the candidate exceeds fifty percent, the shoulder detection algorithm confirms the candidate as the location of the shoulder. The shoulder detection algorithm 310 may determine the height trust level based on the following equation:

$$TL_H = \min\left(\frac{\text{height} - 15°}{20°} \times 50\%, 50\%\right)$$

where height is the measured angle of the candidate. The minimum function takes the lower of fifty percent or the calculated percent using the measured angle. The shoulder detection algorithm 310 may determine the area trust level based on the following equation:

$$TL_A = \min\left(\frac{\text{area }\% - 20\%}{60\%} \times 50\%, 50\%\right)$$

where area is the percentage of measured area under the angle-turns curve for the candidate compared to the total area under the angle-turns curve. The minimum function takes the lower of fifty percent or the calculated percent using the measured area.

Alternatively, the shoulder detection algorithm 310 may determine the location of the shoulder using the measured torque-turns curve. As shown in FIG. 9F, the shoulder detection algorithm 310 may calculate a first derivative of the torque-turns curve. The shoulder detection algorithm 310 may graph the first derivative of the torque-turns curve. A histogram may be created from the points of the first derivative of the torque-turns curve. As seen in FIG. 9F, the histogram shows a first cluster of points at the bottom of the histogram and a second cluster of points at the top of the histogram. A shoulder threshold may be defined between the first cluster of points and second cluster of points. The first cluster of points may represent the first derivative of the torque-turns curve before the shoulder threshold. The second cluster of points may represent the first derivative of the torque-turns curve after the shoulder threshold. The shoulder detection algorithm 310 may select the shoulder threshold as the location of the shoulder. Alternatively, the first derivative of the torque-turns curve may have an inflection point. The inflection point may correspond to the shoulder threshold. The shoulder detection algorithm 310 may select the inflection point as the location of the shoulder.

Figure 9C:
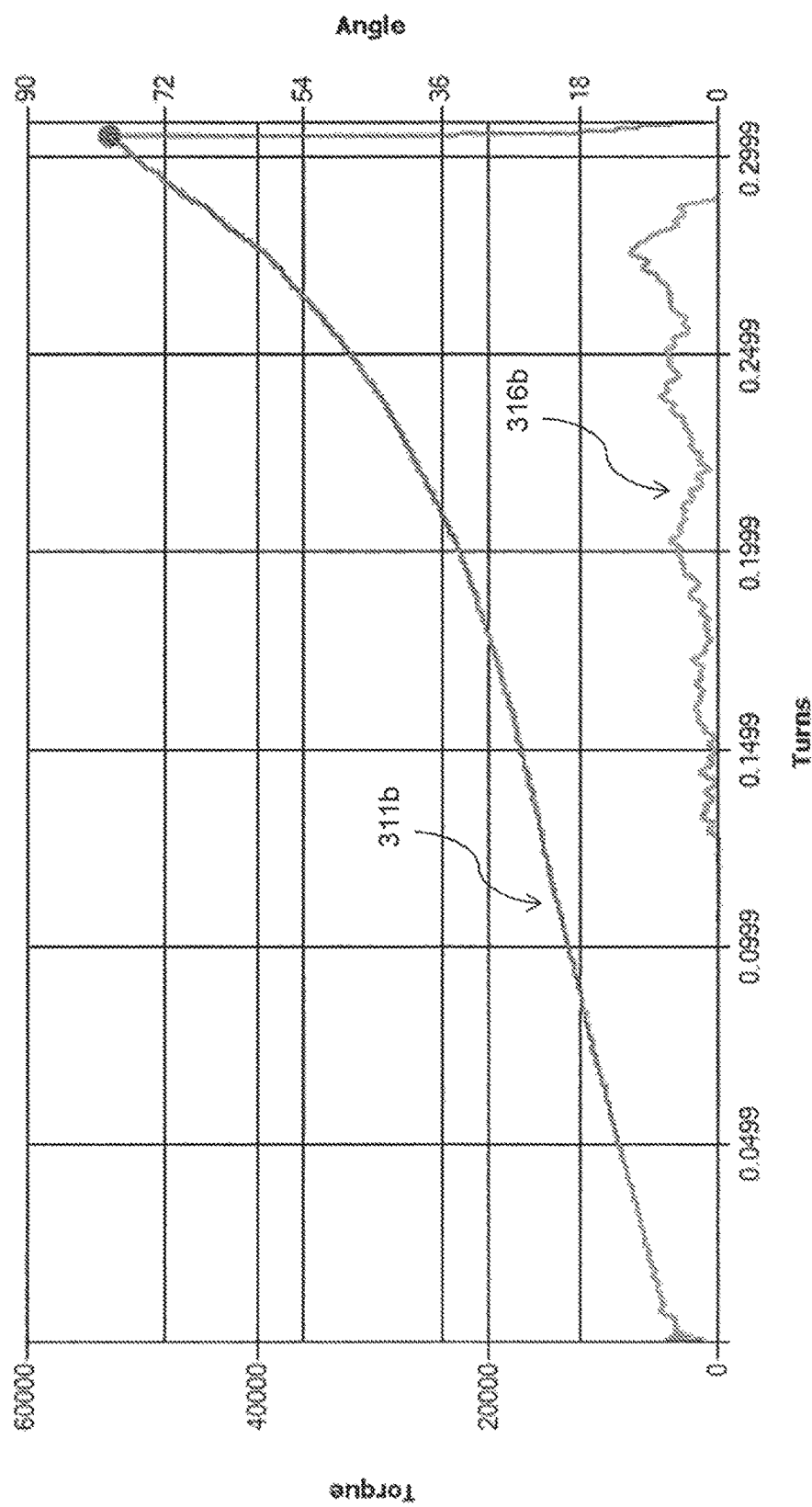
Figure 9E:
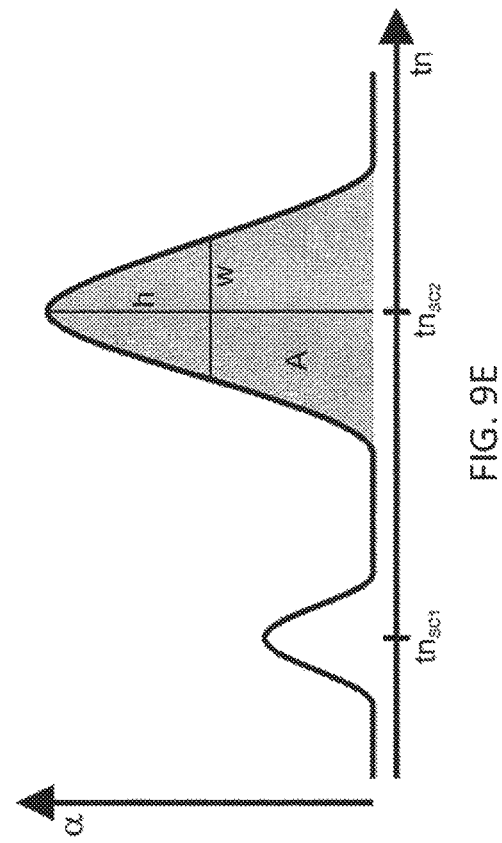
Figure 9D:
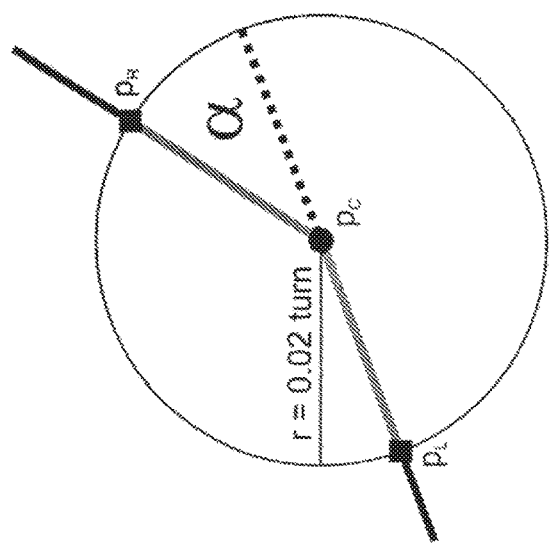
Figure 9F:
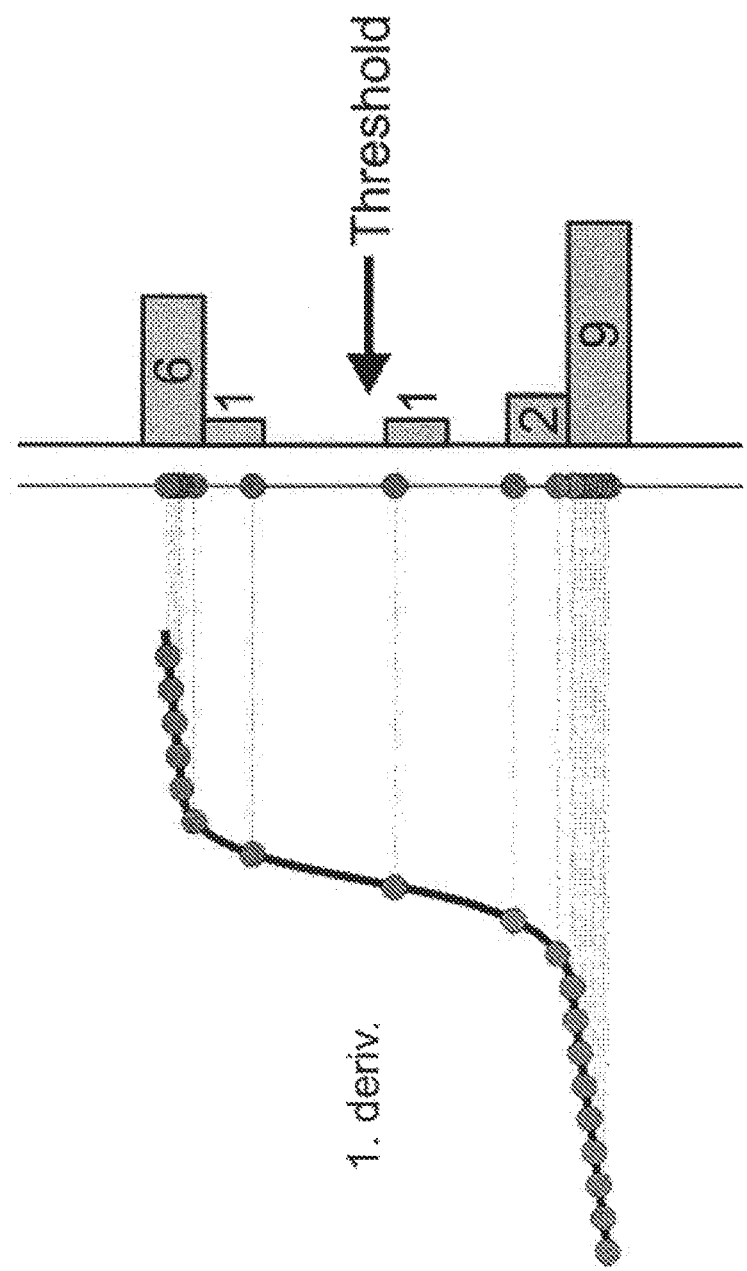

As shown in FIG. 9A, the line 313 from the final measured value 313p to the candidate 315 differs significantly from the torque-turns curve 311a. The line from the final measured value 313p to the candidate 319 follows along the torque-turns curve 311a. The shoulder detector algorithm 310 determines candidate 319 corresponds to the location of the shoulder based on the evaluation and comparison. If the angle-turns curve contains only a single candidate, the single candidate is the location of the shoulder. If the angle-turns curve contains no candidates for the location of the shoulder, the location of the shoulder is not determined and the connection is rejected. FIG. 9C illustrates a torque-turns curve 311b. An angle-turns curve 316b is overlaid using the same process described above. The angle-turns curve 316b never reaches fifteen degrees. As a result, no candidates for the location of the shoulder are selected by the shoulder detector algorithm 310. The shoulder detector algorithm 310 may reject the threaded connection if no candidates for the shoulder are determined. In this embodiment, the control system 206 may send a signal to the TRU 204 in response to the evaluation by the shoulder detector algorithm 310. The TRU 204 may operate the tong assembly 200 to breakout the connection based on the signal.

Figure 10:
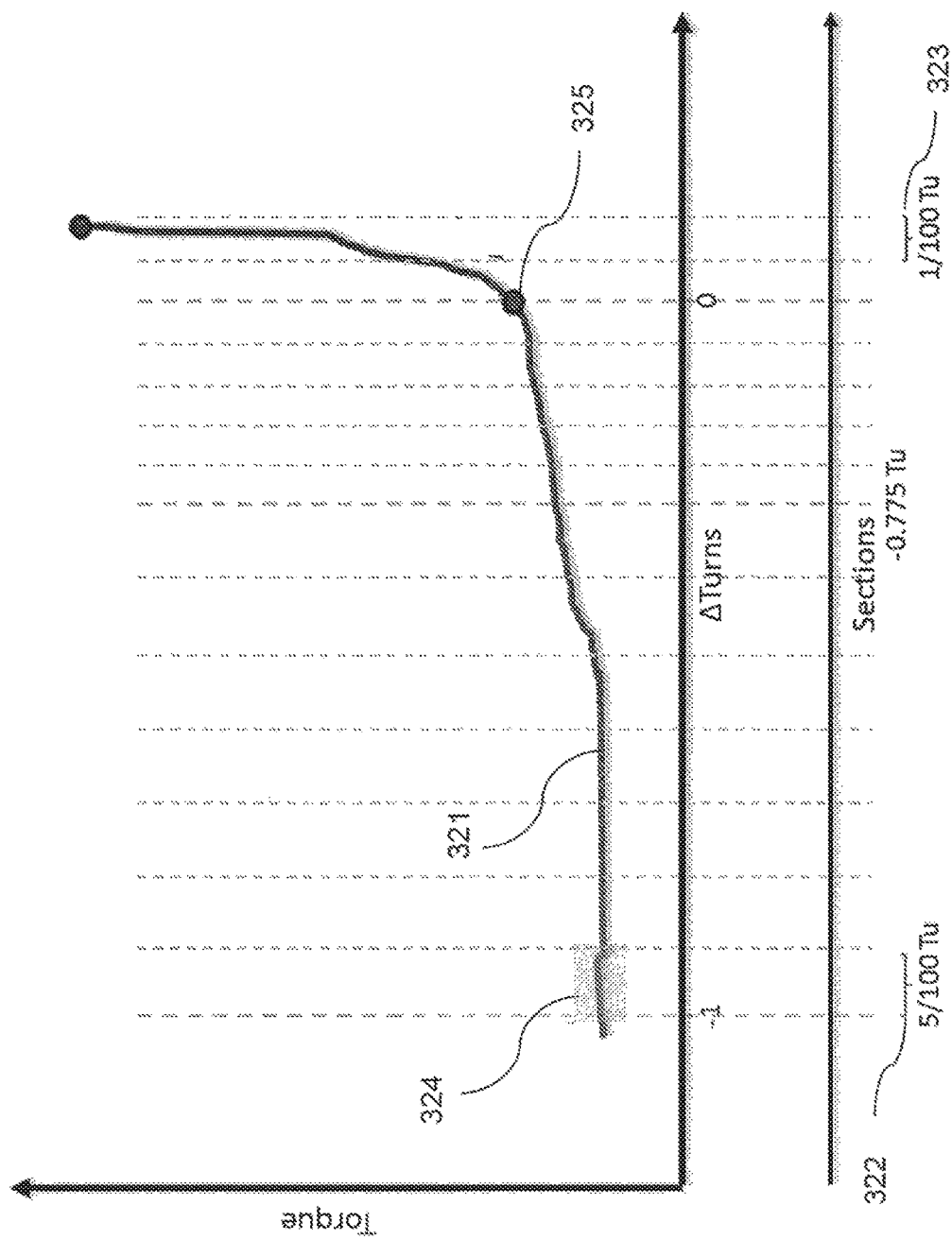
FIG. 10 illustrates operation of an overlay processor for the connection evaluator.

In some embodiments, the connection evaluator 252 may include the overlay processor 320. The overlay processor 320 may serve as a visual assisting tool for an operator. The overlay processor 320 may use data from previous accepted connections. For example, torque-turn curves for ten previous accepted connections may be graphed by the torque-turns plotter 232. As shown in FIG. 10, the graph may be divided into sections 322, 323. The sections 322 have a width of 0.05 turns or less. The width of the sections 323 may be smaller than sections 322, such as 0.01 turns or less. The width of the sections may change around 0.775 turns before the shoulder 325.

A minimum torque value, maximum torque value, and midpoint torque value for each section of the graph is calculated from the torque values of the previous accepted connections. The minimum and maximum torque values in each section create an envelope 324 for each section. The measured torque and measured turn values from the current connection may then be overlaid on the graph as a torque-turns curve 321. The torque-turns curve 321 may be compared by the overlay processer 320 to the minimum and maximum torque values for each section by determining whether the torque-turns curve 321 falls within the envelope 324. Multiple measured torque and measured turns values of the torque-turns curve 321 may be compared in a single envelope 324. The overlay processor 320 may reject the connection if twenty five percent or more of the measured torque and measured turns values of the torque-turns curve 321 fall outside of the envelopes. The overlay processor 320 may also reject the connection if fifteen percent or more of the measured torque and measured turns values of the torque-turns curve 321 fall outside of the envelopes after the shoulder point 325. The control system 206 may send a signal to the TRU 204 in response to the evaluation by the overlay algorithm 320. The TRU 204 may operate the tong assembly 200 to breakout the connection based on the signal.

Alternatively, the connection evaluator 252 may use artificial neuron networks to analyze the measured torque, measured turns, and measured time. Artificial neuron networks may be used to find anomalies in the measured data and/or torque-turns curve. Artificial neuron networks may be used to detect the location of the shoulder, torque spikes, torque drops, oscillation in the torque-turns curve, measured final point, and slippage. The artificial neuron network may be trained on normalized test data from previously assembled acceptable connections.

Alternatively, the connection evaluator 252 may be run by a computer processor, other than the PLC. The PLC may receive and transfer the measured data to the computer processor for use by the connection evaluator 252.

In one embodiment, a method of connecting a first threaded tubular to a second threaded tubular includes engaging the threads of the tubulars and rotating the first tubular relative to the second tubular to makeup a threaded connection. The method further includes, during makeup of the threaded connection: measuring time, measuring torque applied to the connection, and measuring turns of the first tubular. The method further includes using a programmable logic controller for: evaluating at least one of the measured turns, measured torque, and measured time for at least one of a discontinuity, a torque spike, and a torque drop and accepting or rejecting the connection based on the evaluation.

In one or more of the embodiments described herein, the method further includes evaluating at least one of the measured turns, measured torque, and measured time for a lack of connection, including at least one of: determining whether measured turns of the first tubular are less than a minimum turns threshold and determining whether measured torque is less than a minimum torque threshold.

In one or more of the embodiments described herein, the method further includes wherein evaluating at least one of the measured turns, measured torque, and measured time for a torque spike comprises at least one of: determining whether the torque spike exceeds a first torque threshold and determining whether the torque spike exceeds a second torque threshold within a time threshold.

In one or more of the embodiments described herein, the method further includes wherein evaluating at least one of the measured turns, measured torque, and measured time for a torque drop comprises: calculating a torque drop height from the measured torque by using the start and end measured torque values of a torque drop and comparing the torque drop height to a torque drop threshold.

In one or more of the embodiments described herein, wherein the torque height is an average of the measured torque before and after the torque drop.

In one or more of the embodiments described herein, wherein the discontinuity is at least one of: a change in measured torque at constant measured turns, a change in measured turns at constant measured torque, a decrease in measured turns, and a decrease in measured time.

In one or more of the embodiments described herein, the method further includes analyzing at least one candidate for a shoulder position of the threaded connection and accepting or rejecting the connection based on the analysis.

In another embodiment, a method of connecting a first threaded tubular to a second threaded tubular includes engaging the threads of the tubulars and rotating the first tubular relative to the second tubular to makeup a threaded connection. The method further includes, during makeup of the threaded connection: measuring torque applied to the connection, and measuring turns of the first tubular. The method further includes using a programmable logic controller for finding at least one candidate for a shoulder position of the threaded connection from at least one of the measured torque and measured turns, analyzing the at least one candidate, and detecting the shoulder position of the threaded connection based on the analysis.

In one or more of the embodiments described herein, the method further includes selecting the at least one candidate from at least one of the measured torque and measured turns.

In one or more of the embodiments described herein, the method further includes graphing the measured torque and measured turns on a torque-turns curve.

In one or more of the embodiments described herein, the method further includes overlaying a first line from a measured final torque, overlaying a second line from a measured starting torque, measuring an angle between the first line and the second line.

In one or more of the embodiments described herein, the method further includes, determining the shoulder position of the connection based on the measured angle.

In one or more of the embodiments described herein, the method further includes determining the shoulder position of the connection based on the analysis.

In one or more of the embodiments described herein, the method further includes overlaying a circle at a start point on the torque-turns curve, wherein the torque-turns curve intersects the circle at a first point and a second point.

In one or more of the embodiments described herein, the method further includes, measuring an angle between a first line between the start point and the first point and a second line between the start point and the second point In another embodiment, a tubular makeup system includes a power drive operable to rotate a first threaded tubular relative to a second threaded tubular, a torque cell, a turns counter, and a programmable logic controller (PLC) operably connected to the power drive and in communication with the torque cell and turns counter. The PLC is configured to control an operation including engaging threads of the tubulars, rotating the first tubular relative to the second tubular to makeup a threaded connection, and, during makeup of the threaded connection, measuring time, measuring torque applied to the connection, and measuring turns of the first tubular. The operation further includes evaluating at least one of the measured turns, measured torque, and measured time for at least one of a discontinuity, a torque spike, and a torque drop, and accepting or rejecting the connection based on the evaluation.

In one or more of the embodiments described herein, the operation further includes evaluating at least one of the measured turns, measured torque, and measured time for a lack of connection, including at least one of: determining whether measured turns of the first tubular are less than a minimum turns threshold; and determining whether measured torque is less than a minimum torque threshold.

In one or more of the embodiments described herein, evaluating at least one of the measured turns, measured torque, and measured time for a torque spike includes at least one of determining whether the measured torque exceeds a first torque threshold and determining whether a spike in measured torque exceeds a second torque threshold within a time threshold.

In one or more of the embodiments described herein, evaluating at least one of the measured turns, measured torque, and measured time for a torque drop includes calculating a torque drop height from the measured torque by using the start and end measured torque values of a torque drop and comparing the torque drop height to a torque drop threshold.

In another embodiment, a tubular makeup system includes a power drive operable to rotate a first threaded tubular relative to a second threaded tubular, a torque cell, a turns counter, and a programmable logic controller (PLC) operably connected to the power drive and in communication with the torque cell and turns counter. The PLC is configured to control an operation including engaging threads of the tubulars, rotating the first tubular relative to the second tubular to makeup a threaded connection, and, during makeup of the threaded connection, measuring torque applied to the connection and measuring turns of the first tubular. The operation further includes, finding at least one candidate for a shoulder position of the threaded connection from at least one of the measured torque and measured turns, analyzing the at least one candidate, and detecting the shoulder position of the threaded connection based on the analysis.

In one or more of the embodiments described herein, the operation further includes overlaying a first line from a measured final torque, overlaying a second line from a measured initial torque, and measuring an angle between the first line and the second line.

In one or more of the embodiments described herein, wherein the operation further comprises determining the shoulder position of the connection based on the measured angle.

While the foregoing is directed to embodiments of the present disclosure, other and further embodiments of the disclosure may be devised without departing from the basic scope thereof, and the scope of the invention is determined by the claims that follow.

The invention claimed is:

1. A method of connecting a first threaded tubular to a second threaded tubular, comprising:
  engaging threads of the first tubular and the second tubular;
  rotating the first tubular relative to the second tubular to makeup a threaded connection;
  during makeup of the threaded connection:
    measuring time;
    measuring torque applied to the connection; and
    measuring turns of the first tubular;
  using a controller for:
    evaluating at least one of the measured turns, the measured torque, and the measured time for at least one of a discontinuity, a torque spike, and a torque drop;
    accepting or rejecting the connection based on the evaluation; and
    finding at least one candidate for a shoulder position of the threaded connection from at least one of the measured torque and the measured turns comprising:
      graphing the measured torque and the measured turns on a torque-turns curve;
      overlaying a first line from a measured final torque value on the torque-turns curve to a point along the torque-turns curve;
      overlaying a second line from a measured starting torque value on the torque-turns curve to the point; and
      measuring an angle between the first line and the second line.

2. The method of claim 1, further comprising evaluating the at least one of the measured turns, the measured torque, and the measured time for a lack of connection, comprising at least one of:
  determining whether the measured turns of the first tubular are less than a minimum turns threshold; and
  determining whether the measured torque is less than a minimum torque threshold.

3. The method of claim 1, wherein the evaluating comprises evaluating the at least one of the measured turns, the measured torque, and the measured time for the torque spike further comprising at least one of:
  determining whether the torque spike exceeds a first torque threshold; and
  determining whether the torque spike exceeds a second torque threshold within a time threshold.

4. The method of claim 1, wherein the evaluating comprises evaluating the at least one of the measured turns, the measured torque, and the measured time for the torque drop further comprising:
  calculating a torque drop height from the measured torque by using a start and an end measured torque values of the torque drop; and
  comparing the torque drop height to a torque drop threshold.

5. The method of claim 4, wherein the torque drop height is calculated using an average of the start and the end measured torque values.

6. The method of claim 1, wherein the evaluating comprises evaluating the at least one of the measured turns, the measured torque, and the measured time for the discontinuity, wherein the discontinuity is at least one of:
  a change in measured torque at constant measured turns;
  a change in measured turns at constant measured torque;
  a decrease in measured turns; and
  a decrease in measured time.

7. The method of claim 1, further comprising: analyzing the at least one candidate for a shoulder position of the threaded connection; and accepting or rejecting the connection based on the analysis.

8. The method of claim 1, wherein the controller comprises a programmable logic controller.

9. The method of claim 1, wherein at least one of the first tubular and the second tubular includes a coupling.

10. The method of claim 9, wherein rotating the first tubular relative to the second tubular comprises rotating the first tubular relative to a coupling of the second tubular.

11. The method of claim 1, wherein the evaluating comprises evaluating the at least one of the measured turns, the measured torque, and the measured time for the discontinuity, wherein the discontinuity results from a malfunction.

12. A method of connecting a first threaded tubular to a second threaded tubular, comprising:
engaging threads of the first tubular and the second tubular;
rotating the first tubular relative to the second tubular to makeup a threaded connection;
during makeup of the threaded connection:
measuring torque applied to the connection; and
measuring turns of the first tubular;
using a controller for:
finding at least one candidate for a shoulder position of the threaded connection from the at least one of the measured torque and the measured turns;
analyzing the at least one candidate; and
detecting the shoulder position of the threaded connection based on the analysis;
wherein finding the at least one candidate comprises:
graphing the measured torque and the measured turns on a torque-turns curve;
overlaying a first line from a measured final torque value on the torque-turns curve to a point along the torque-turns curve;
overlaying a second line from a measured starting torque value on the torque-turns curve to the point; and
measuring an angle between the first line and the second line.

13. The method of claim 12, further comprising determining the shoulder position of the connection based on the measured angle.

14. A tubular makeup system, comprising:
a power drive operable to rotate a first threaded tubular relative to a second threaded tubular;
a torque cell;
a turns counter; and
a controller operably connected to the power drive and in communication with the torque cell and the turns counter, wherein the controller is configured to control an operation, the operation comprising:
engaging threads of the first tubular and the second tubular;
rotating the first tubular relative to the second tubular to makeup a threaded connection;
during makeup of the threaded connection:
measuring time;
measuring torque applied to the connection; and
measuring turns of the first tubular;
evaluating at least one of the measured turns, the measured torque, and the measured time for at least one of a discontinuity, a torque spike, and a torque drop;
accepting or rejecting the connection based on the evaluation; and
finding the at least one candidate for a shoulder position of the threaded connection from the at least one of the measured torque and the measured turns comprising:
graphing the measured torque and the measured turns on a torque-turns curve;
overlaying a first line from a measured final torque value on the torque-turns curve to a point along the torque-turns curve;
overlaying a second line from a measured starting torque value on the torque-turns curve to the point; and
measuring an angle between the first line and the second line.

15. The system of claim 14, wherein the operation further comprises evaluating the at least one of the measured turns, the measured torque, and the measured time for a lack of connection, comprising at least one of:
determining whether the measured turns of the first tubular are less than a minimum turns threshold; and
determining whether the measured torque is less than a minimum torque threshold.

16. The system of claim 14, wherein the evaluating comprises evaluating the at least one of the measured turns, the measured torque, and the measured time for the torque spike further comprising at least one of:
determining whether the measured torque exceeds a first torque threshold; and
determining whether a spike in the measured torque exceeds a second torque threshold within a time threshold.

17. The system of claim 14, wherein the evaluating comprises evaluating the at least one of the measured turns, the measured torque, and the measured time for the torque drop further comprising:
calculating a torque drop height from the measured torque by using a start and an end measured torque values of the torque drop; and
comparing the torque drop height to a torque drop threshold.

18. The system of claim 14, wherein the evaluating comprises evaluating the at least one of the measured turns, the measured torque, and the measured time for the discontinuity, wherein the discontinuity is at least one of:
a change in measured torque at constant measured turns;
a change in measured turns at constant measured torque;
a decrease in measured turns; and
a decrease in measured time.

19. The system of claim 14, wherein the evaluating comprises evaluating the at least one of the measured turns, the measured torque, and the measured time for the discontinuity, wherein the discontinuity results from a malfunction.

20. A tubular makeup system, comprising:
a power drive operable to rotate a first threaded tubular relative to a second threaded tubular;
a torque cell;
a turns counter; and
a controller operably connected to the power drive and in communication with the torque cell and the turns counter, wherein the controller is configured to control an operation, the operation comprising:
engaging threads of the first tubular and the second tubular;
rotating the first tubular relative to the second tubular to makeup a threaded connection;

during makeup of the threaded connection:
  measuring a torque applied to the connection; and
  measuring turns of the first tubular;
finding at least one candidate for a shoulder position of the threaded connection from the at least one of the measured torque and the measured turns;
analyzing the at least one candidate; and
detecting the shoulder position of the threaded connection based on the analysis;
wherein finding the at least one candidate comprises:
graphing the measured torque and the measured turns on a torque-turns curve;
overlaying a first line from a measured final torque value on the torque-turns curve to a point along the torque-turns curve;
overlaying a second line from a measured starting torque value on the torque-turns curve to the point; and
measuring an angle between the first line and the second line.

21. The system of claim 20, wherein the operation further comprises determining the shoulder position of the connection based on the measured angle.

\* \* \* \* \*